US009478174B2

(12) United States Patent
Yaras et al.

(10) Patent No.: US 9,478,174 B2
(45) Date of Patent: Oct. 25, 2016

(54) ARTIFACT MITIGATION FOR COMPOSITE PRIMARY COLOR TRANSITION

(71) Applicant: Pixtronix, Inc., San Diego, CA (US)

(72) Inventors: Fahri Yaras, Chelsea, MA (US); Edward Buckley, Melrose, MA (US)

(73) Assignee: Pixtronix, Inc., San Diego, CA (US)

( * ) Notice: Subject to any disclaimer, the term of this patent is extended or adjusted under 35 U.S.C. 154(b) by 113 days.

(21) Appl. No.: 14/457,742

(22) Filed: Aug. 12, 2014

(65) Prior Publication Data

US 2015/0194101 A1 Jul. 9, 2015

Related U.S. Application Data

(60) Provisional application No. 61/923,569, filed on Jan. 3, 2014.

(51) Int. Cl.

| | |
|---|---|
| ***G06T 11/00*** | (2006.01) |
| ***G06T 5/00*** | (2006.01) |
| ***G06T 5/40*** | (2006.01) |
| ***G06T 3/40*** | (2006.01) |
| ***G09G 5/02*** | (2006.01) |
| ***G09G 3/34*** | (2006.01) |
| ***H04N 1/60*** | (2006.01) |
| ***H04N 5/202*** | (2006.01) |

(Continued)

(52) U.S. Cl.

CPC .......... *G09G 3/3413* (2013.01); *G09G 3/3426* (2013.01); *G09G 3/3433* (2013.01); *G09G 3/3466* (2013.01); *G09G 2300/0452* (2013.01); *G09G 2310/0235* (2013.01); *G09G 2320/0242* (2013.01); *G09G 2320/0266* (2013.01); *G09G 2320/0646* (2013.01); *G09G 2320/0666* (2013.01); *G09G 2360/16* (2013.01)

(58) Field of Classification Search

CPC combination set(s) only.
See application file for complete search history.

(56) References Cited

U.S. PATENT DOCUMENTS

2007/0064008 A1 3/2007 Childers
2009/0102783 A1 4/2009 Hwang et al.

(Continued)

FOREIGN PATENT DOCUMENTS

JP 2003248462 A 9/2003
WO 2014070746 5/2014

OTHER PUBLICATIONS

International Search Report and Written Opinion—PCT/US2014/072366—ISA/EPO—Mar. 6, 2015.

*Primary Examiner* — Wesner Sajous
(74) *Attorney, Agent, or Firm* — Foley & Lardner LLP; Paul S. Hunter

(57) ABSTRACT

This disclosure provides systems, methods and apparatus, including computer programs encoded on computer storage media, for displaying image frames. A smoothing process can be utilized for mitigating image artifacts similar to dynamic false contouring (DFC). In some implementations, were a display to transition from an field specific contributing color (FSCC) having only two component colors to a target FSCC with meaningful intensities of all three component colors, or vice versa, and that target FSCC remained constant over a series of image frames, DFC-like artifacts would be mitigated at the transition by gradually, over a first number of image frames in a series of image frames, reducing the intensities of all component colors of the FSCC to values at or near zero, before gradually increasing the intensities of the component colors included in the target FSCC to their final target values over a remainder of image frames in the series of image frames.

17 Claims, 15 Drawing Sheets

(51) Int. Cl.
*H04N 9/44* (2006.01)
*H04N 9/64* (2006.01)

(56) References Cited

U.S. PATENT DOCUMENTS

| | | | | |
|---|---|---|---|---|
| 2010/0214325 | A1 | 8/2010 | Koyama et al. | |
| 2011/0109658 | A1 | 5/2011 | Park | |
| 2012/0200481 | A1 | 8/2012 | Tsubata | |
| 2013/0293598 | A1 | 11/2013 | Ishihara | |
| 2013/0321477 | A1 | 12/2013 | Gandhi et al. | |
| 2013/0321633 | A1* | 12/2013 | Peterson | B60R 1/12 348/148 |
| 2013/0322752 | A1* | 12/2013 | Lim | G06T 5/20 382/167 |
| 2014/0058217 | A1* | 2/2014 | Giovangrandi | A61B 5/0295 600/301 |

* cited by examiner

ARTIFACT MITIGATION FOR COMPOSITE PRIMARY COLOR TRANSITION

RELATED APPLICATIONS

The present application for patent claims priority to U.S. Provisional Application No. 61/923,569, entitled "ARTIFACT MITIGATION FOR COMPOSITE PRIMARY COLOR TRANSITION," filed Jan. 3, 2014, and assigned to the assignee hereof and hereby expressly incorporated by reference herein.

TECHNICAL FIELD

This disclosure relates to the field of displays, and in particular, to the formation of images on field sequential color (FSC)-based displays.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

EMS-based display apparatus can include display elements that modulate light by selectively moving a light blocking component into and out of an optical path through an aperture defined through a light blocking layer. Doing so selectively passes light from a backlight or reflects light from the ambient or a front light to form an image.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus including an input configured to receive image data corresponding to a current image frame and image data corresponding to a target image frame and contributing color selection logic. The contributing color selection logic configured to obtain based on received image data, an old frame specific contributing color ($FSCC_{old}$) for the current image frame and a target frame specific contributing color ($FSCC_{target}$) for the target image frame, determine whether a transition artifact mitigation condition is met, wherein the transition artifact mitigation conditions includes the $FSCC_{old}$ including only two component colors having non-zero intensities and the $FSCC_{target}$ including three component colors having non-zero intensities and the $FSCC_{old}$ including three component colors having non-zero intensities and the $FSCC_{target}$ including only two component colors having non-zero intensities, in response to a transition artifact mitigation condition being determined to be true, determine whether any component colors of the $FSCC_{old}$ are greater than a first threshold intensity, in response to determining that at least one component color of the $FSCC_{old}$ has a greater intensity than the first threshold intensity, reduce intensities of component colors of $FSCC_{old}$ that are over the first threshold intensity to generate a next frame specific contributing color ($FSCC_{next}$) for a next image frame, in response to the transition artifact mitigation conditions being determined to be false or in response to determining that none of the component colors of the $FSCC_{old}$ have intensities greater than the first threshold, setting $FSCC_{next}$ equal to $FSCC_{target}$ or to an intermediate FSCC having component color values between $FSCC_{old}$ and $FSCC_{target}$, and use the $FSCC_{next}$ to display the next image frame.

In some implementations, the first threshold intensity is based on an overall brightness of the current image frame. In some implementations, the contributing color selection logic is configured to reduce intensities of component colors of $FSCC_{old}$ that are over the first threshold intensity by amounts that are fractions of intensities of their respective component colors. In some implementations, the contributing color selection logic is configured to reduce, by a constant amount, intensities of those component colors of $FSCC_{old}$ that are over the first threshold intensity. In some implementations, the component colors include colors red, green and blue (RGB).

In some implementations, the apparatus further includes the display, wherein the display includes a plurality of display elements, a processor that is configured to communicate with the display, the processor configured to process image data, and a memory device that is configured to communicate with the processor. In some implementations, the apparatus further includes a driver circuit configured to send at least one signal to the display, and a controller, including the contributing color selection logic and the subframe generation logic, configured to send at least a portion of the image data to the driver circuit. In some implementations, the apparatus further includes an image source module configured to send the image data to the processor, where the image source module includes at least one of a receiver, transceiver, and transmitter. The apparatus further includes an input device configured to receive input data and to communicate the input data to the processor.

Another innovative aspect of the subject matter described in this disclosure can be implemented in a method including obtaining, based on received image data, an old frame specific contributing color ($FSCC_{old}$) for a current image frame and a target frame specific contributing color ($FSCC_{target}$) for a target image frame, determining whether a transition artifact mitigation condition is met, wherein the transition artifact mitigation conditions includes the $FSCC_{old}$ including only two component colors having non-zero intensities and the $FSCC_{target}$ including three component colors having non-zero intensities and the $FSCC_{old}$ including three component colors having non-zero intensities and the $FSCC_{target}$ including only two component colors having non-zero intensities, in response to a transition artifact mitigation condition being determined to be true, determining whether any component colors of the $FSCC_{old}$ have intensities greater than a first threshold intensity, in response to determining that at least one component color of the $FSCC_{old}$ has an intensity greater than a first threshold intensity, reducing intensities of component colors of $FSCC_{old}$ that are over the first threshold intensity to generate a next frame specific contributing color ($FSCC_{next}$) for a next image frame, in response to the transition artifact mitigation conditions being determined to be false or in response to determining that none of the component colors of the $FSCC_{old}$ have intensities greater than the first threshold, setting $FSCC_{next}$ equal to $FSCC_{target}$ or to an intermediate FSCC having component color values between $FSCC_{old}$ and $FSCC_{target}$, and using the $FSCC_{next}$ to display the next image frame.

In some implementations, the first threshold intensity is based on an overall brightness of the current image frame. In some implementations, reducing intensities of component colors of $FSCC_{old}$ that are over the first threshold intensity to generate the $FSCC_{next}$ includes reducing the intensities of the component colors by a fraction of the intensities of the component colors. In some implementations, reducing intensities of component colors of $FSCC_{old}$ that are over the first threshold intensity to generate the $FSCC_{next}$ includes reducing the intensities of the component colors by a constant amount.

Another innovative aspect of the subject matter described in this disclosure can be implemented in a non-transitory computer readable storage medium having instructions encoded thereon, which when executed by a processor cause the processor to perform a method for displaying an image. The method includes obtaining, based on received image data, an old frame specific contributing color ($FSCC_{old}$) for a current image frame and a target frame specific contributing color ($FSCC_{target}$) for a target image frame, determining whether a transition artifact mitigation condition is met, wherein the transition artifact mitigation conditions includes the $FSCC_{old}$ including only two component colors over a threshold intensity and the $FSCC_{target}$ including three component colors having non-zero intensities and the $FSCC_{old}$ including three component colors having non-zero intensities and the $FSCC_{target}$ including only two component colors having non-zero intensities, in response to a transition artifact mitigation condition being determined to be true, determining whether any component colors of the $FSCC_{old}$ have intensities greater than a first threshold intensity, in response to determining that at least one component colors of the $FSCC_{old}$ has an intensity greater than a first threshold, reducing intensities of component colors of $FSCC_{old}$ that are over the first threshold intensity to generate a next frame specific contributing color ($FSCC_{next}$) for a next image frame, in response to the transition artifact mitigation conditions being determined to be false or in response to determining that none of the component colors of the $FSCC_{old}$ have intensities greater than the first threshold, setting $FSCC_{next}$ equal to $FSCC_{target}$ or to an intermediate FSCC having component color values between $FSCC_{old}$ and $FSCC_{target}$, and using the $FSCC_{next}$ to display the next image frame.

In some implementations, the first threshold intensity is based on an overall brightness of the current image frame. In some implementations, reducing intensities of component colors of $FSCC_{old}$ that are over the first threshold intensity to generate the $FSCC_{next}$ includes reducing the intensities of the component colors by a fraction of the intensities of the component colors. In some implementations, reducing intensities of component colors of $FSCC_{old}$ that are over the first threshold intensity to generate the $FSCC_{next}$ includes reducing the intensities of the component colors by a constant amount.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCD), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
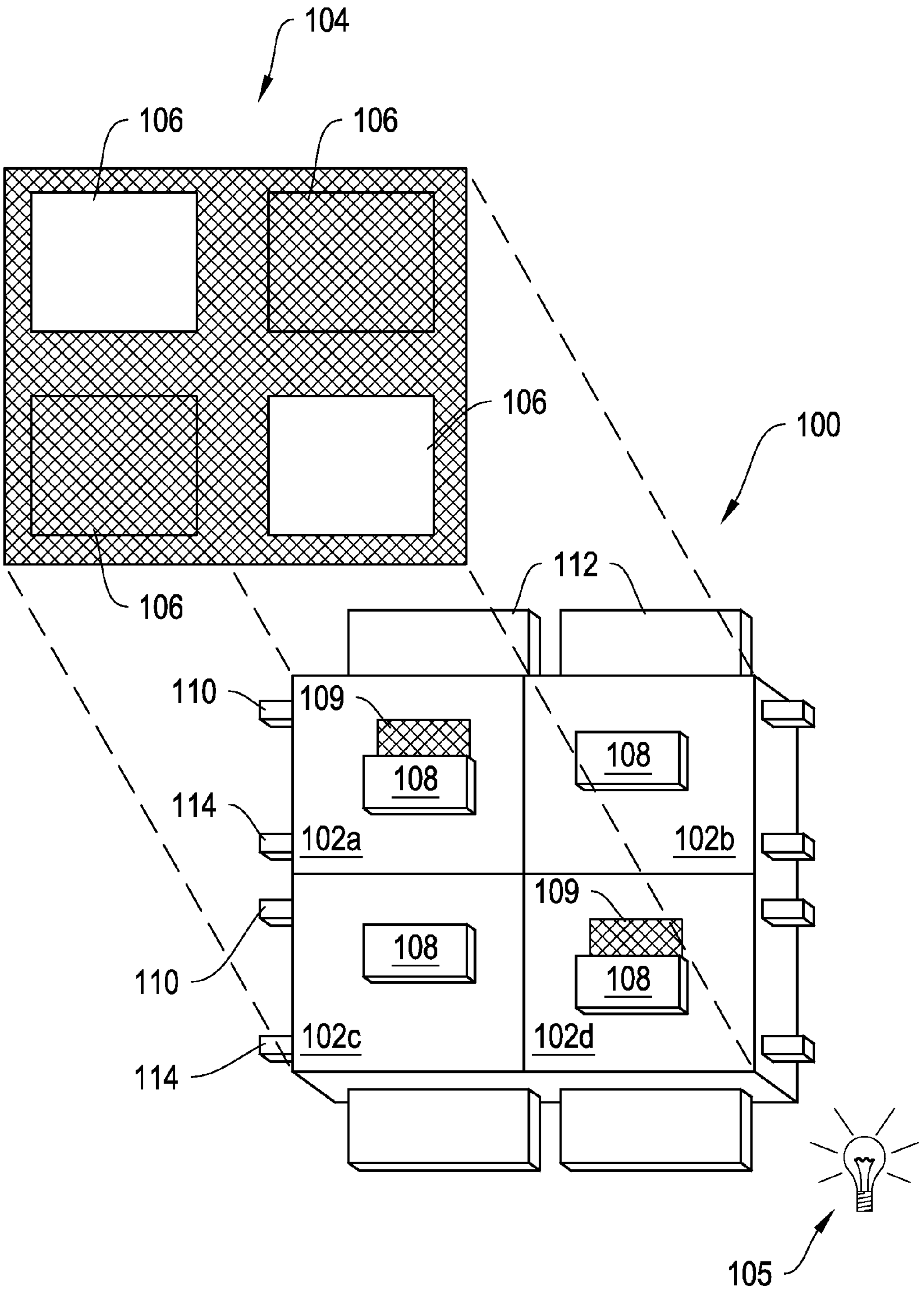
FIG. 1A shows an example schematic diagram of a direct-view microelectromechanical systems (MEMS) based display apparatus.

This disclosure relates to image formation processes and devices for implementing such processes. The image formation processes are particularly, though not exclusively, suited for use in field sequential color (FSC)-based displays. Three classes of displays that may employ FSC-based image formation processes, and therefore can take advantage of the processes and controllers disclosed herein, are liquid crystal displays (LCDs), organic light emitting diodes (OLED) displays, and electromechanical systems (EMS) displays, including nanoelectromechanical systems (NEMS), microelectromechanical systems (MEMS), and larger scale EMS displays. The devices for implementing such processes can include controllers included in display modules; other types of controllers, such as graphics controllers, memory controllers, or network interface controllers; processors in host devices that include display modules, such as televisions, mobile telephones, smart phones, laptop or tablet computers, global navigation satellite system (GNSS) devices, portable gaming devices, etc.; or in processors of standalone devices that output image data to display devices, such as desktop computers, set-top boxes, video gaming consoles, digital video recorders, etc. Each of these devices, and other similar devices, will generally be referred to herein as "controllers."

In some implementations, a smoothing process can be utilized for mitigating image artifacts similar to dynamic false contouring (DFC). In some implementations, were a display to transition from an image frame with a field specific contributing color (FSCC) having only two component colors to a target image frame having a target FSCC with meaningful intensities of all three component colors, or vice versa, and that target FSCC remained constant over a series of image frames, DFC-like artifacts can be mitigated at the transition by gradually, over a first number of image frames in a series of image frames, reducing the intensities of all component colors of the FSCC to values at or near zero, before gradually increasing the intensities of the component colors included in the target FSCC to their final target values over a remainder of image frames in the series of image frames.

In some implementations, with video content, target FSCCs may change (sometimes quite dramatically) from frame to frame. Accordingly, the FSCC smoothing process can be designed to accommodate changing target FSCC values, and make frame by frame FSCC determinations to limit CBU while maintaining the ability to adjust FSCCs in a flexible manner.

Particular implementations of the subject matter described in this disclosure can be implemented to realize one or more of the following potential advantages. In general, the image formation processes disclosed herein mitigate DFC-like image artifacts in FSC-based displays. The image formation processes do so by displaying one or more intermediate image frame between a current image frame and a target image frame.

FIG. 1A shows a schematic diagram of an example direct-view MEMS-based display apparatus 100. The display apparatus 100 includes a plurality of light modulators 102*a*-102*d* (generally light modulators 102) arranged in rows and columns. In the display apparatus 100, the light modulators 102*a* and 102*d* are in the open state, allowing light to pass. The light modulators 102*b* and 102*c* are in the closed state, obstructing the passage of light. By selectively setting the states of the light modulators 102*a*-102*d*, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a pixel corresponds to the smallest picture element defined by the resolution of image. With respect to structural components of the display apparatus 100, the term pixel refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the image can be seen by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or backlight so that each pixel can be uniformly illuminated. Transmissive direct-view displays are often built onto transparent substrates to facilitate a sandwich assembly arrangement where one substrate, containing the light modulators, is positioned over the backlight. In some implementations, the transparent substrate can be a glass substrate (sometimes referred to as a glass plate or panel), or a plastic substrate. The glass substrate may be or include, for example, a borosilicate glass, wine glass, fused silica, a soda lime glass, quartz, artificial quartz, Pyrex, or other suitable glass material.

Each light modulator 102 can include a shutter 108 and an aperture 109. To illuminate a pixel 106 in the image 104, the shutter 108 is positioned such that it allows light to pass through the aperture 109. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix coupled to the substrate and to the light modulators for controlling the movement of the shutters. The control matrix includes a series of electrical interconnects (such as interconnects 110, 112 and 114), including at least one write-enable interconnect 110 (also referred to as a scan line interconnect) per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the write-enabling voltage, $V_{WE}$), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate drive voltages, which are typically higher in magnitude than the data voltages, to the light modulators 102. The application of these drive voltages results in the electrostatic driven movement of the shutters 108.

The control matrix also may include, without limitation, circuitry, such as a transistor and a capacitor associated with each shutter assembly. In some implementations, the gate of each transistor can be electrically connected to a scan line interconnect. In some implementations, the source of each transistor can be electrically connected to a corresponding data interconnect. In some implementations, the drain of each transistor may be electrically connected in parallel to an electrode of a corresponding capacitor and to an electrode of a corresponding actuator. In some implementations, the other electrode of the capacitor and the actuator associated with each shutter assembly may be connected to a common or ground potential. In some other implementations, the transistor can be replaced with a semiconducting diode, or a metal-insulator-metal switching element.

Figure 1B:
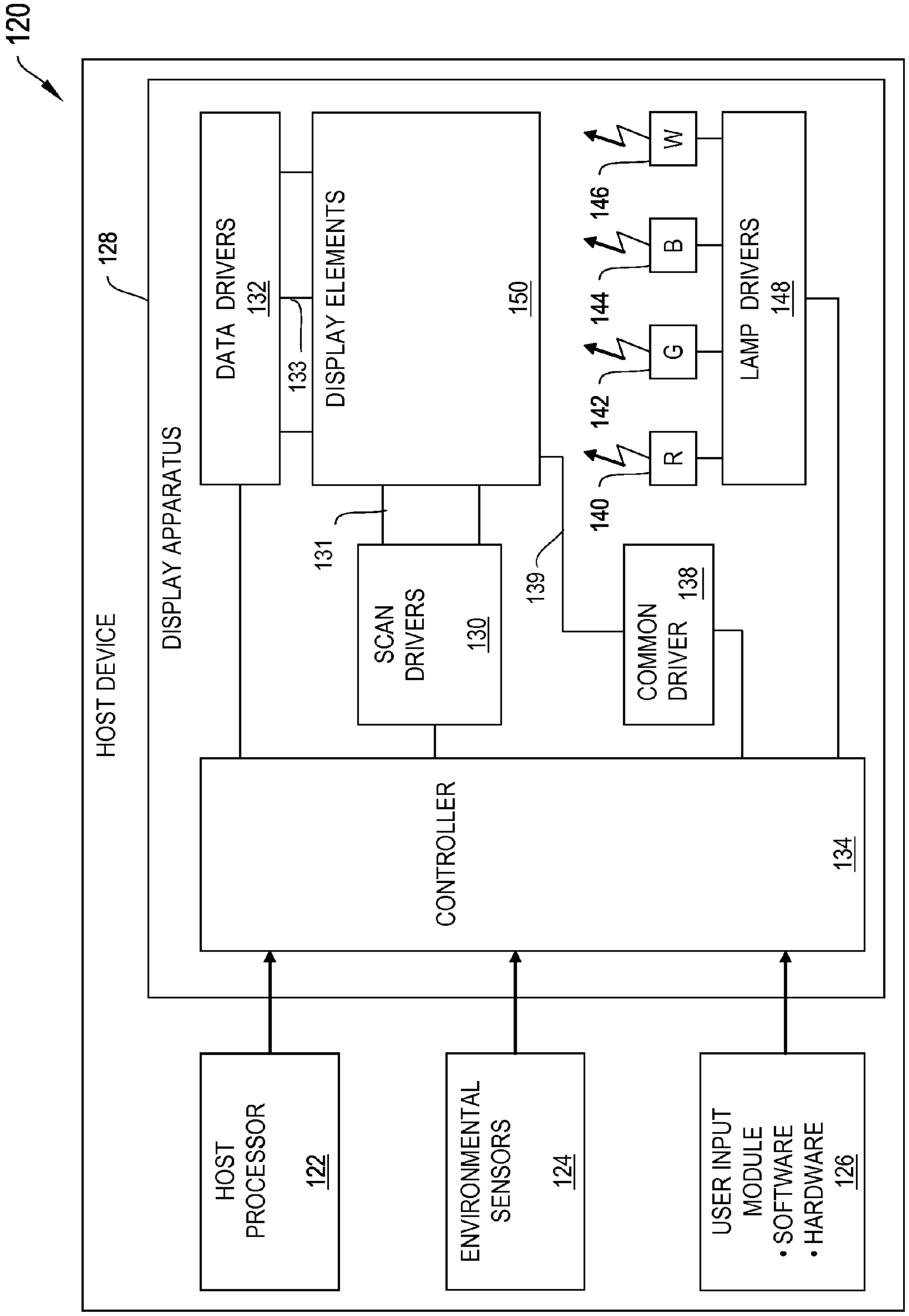
FIG. 1B shows an example block diagram of a host device.

FIG. 1B shows a block diagram of an example host device 120 (i.e., cell phone, smart phone, PDA, MP3 player, tablet, e-reader, netbook, notebook, watch, wearable device, laptop, television, or other electronic device). The host device 120 includes a display apparatus 128 (such as the display apparatus 100 shown in FIG. 1A), a host processor 122, environmental sensors 124, a user input module 126, and a power source.

The display apparatus 128 includes a plurality of scan drivers 130 (also referred to as write enabling voltage sources), a plurality of data drivers 132 (also referred to as data voltage sources), a controller 134, common drivers 138, lamps 140-146, lamp drivers 148 and an array of display elements 150, such as the light modulators 102 shown in FIG. 1A. The scan drivers 130 apply write enabling voltages to scan line interconnects 131. The data drivers 132 apply data voltages to the data interconnects 133.

In some implementations of the display apparatus, the data drivers 132 are capable of providing analog data voltages to the array of display elements 150, especially where the luminance level of the image is to be derived in analog fashion. In analog operation, the display elements are designed such that when a range of intermediate voltages is applied through the data interconnects 133, there results a range of intermediate illumination states or luminance levels in the resulting image. In some other implementations, the data drivers 132 are capable of applying only a reduced set, such as 2, 3 or 4, of digital voltage levels to the data interconnects 133. In implementations in which the display elements are shutter-based light modulators, such as the light modulators 102 shown in FIG. 1A, these voltage levels are designed to set, in digital fashion, an open state, a closed state, or other discrete state to each of the shutters 108. In some implementations, the drivers are capable of switching between analog and digital modes.

The scan drivers 130 and the data drivers 132 are connected to a digital controller circuit 134 (also referred to as the controller 134). The controller 134 sends data to the data drivers 132 in a mostly serial fashion, organized in sequences, which in some implementations may be predetermined, grouped by rows and by image frames. The data drivers 132 can include series-to-parallel data converters, level-shifting, and for some applications digital-to-analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 139. In some other implementations, the common drivers 138, following commands from the controller 134, issue voltage pulses or signals to the array of display elements 150, for instance global actuation pulses which are capable of driving and/or initiating simultaneous actuation of all display elements in multiple rows and columns of the array.

Each of the drivers (such as scan drivers 130, data drivers 132 and common drivers 138) for different display functions can be time-synchronized by the controller 134. Timing commands from the controller 134 coordinate the illumination of red, green, blue and white lamps (140, 142, 144 and 146 respectively) via lamp drivers 148, the write-enabling and sequencing of specific rows within the array of display elements 150, the output of voltages from the data drivers 132, and the output of voltages that provide for display element actuation. In some implementations, the lamps are light emitting diodes (LEDs).

The controller 134 determines the sequencing or addressing scheme by which each of the display elements can be re-set to the illumination levels appropriate to a new image 104. New images 104 can be set at periodic intervals. For instance, for video displays, color images or frames of video are refreshed at frequencies ranging from 10 to 300 Hertz (Hz). In some implementations, the setting of an image frame to the array of display elements 150 is synchronized with the illumination of the lamps 140, 142, 144 and 146 such that alternate image frames are illuminated with an alternating series of colors, such as red, green, blue and white. The image frames for each respective color are referred to as color subframes. In this method, referred to as the field sequential color method, if the color subframes are alternated at frequencies in excess of 20 Hz, the human visual system (HVS) will average the alternating frame images into the perception of an image having a broad and continuous range of colors. In some other implementations, the lamps can employ primary colors other than red, green, blue and white. In some implementations, fewer than four, or more than four lamps with primary colors can be employed in the display apparatus 128.

In some implementations, where the display apparatus 128 is designed for the digital switching of shutters, such as the shutters 108 shown in FIG. 1A, between open and closed states, the controller 134 forms an image by the method of time division gray scale. In some other implementations, the display apparatus 128 can provide gray scale through the use of multiple display elements per pixel.

In some implementations, the data for an image state is loaded by the controller 134 to the array of display elements 150 by a sequential addressing of individual rows, also referred to as scan lines. For each row or scan line in the sequence, the scan driver 130 applies a write-enable voltage to the write enable interconnect 131 for that row of the array of display elements 150, and subsequently the data driver 132 supplies data voltages, corresponding to desired shutter states, for each column in the selected row of the array. This addressing process can repeat until data has been loaded for all rows in the array of display elements 150. In some implementations, the sequence of selected rows for data loading is linear, proceeding from top to bottom in the array of display elements 150. In some other implementations, the sequence of selected rows is pseudo-randomized, in order to mitigate potential visual artifacts. And in some other implementations, the sequencing is organized by blocks, where, for a block, the data for only a certain fraction of the image is loaded to the array of display elements 150. For example, the sequence can be implemented to address only every fifth row of the array of the display elements 150 in sequence.

In some implementations, the addressing process for loading image data to the array of display elements 150 is separated in time from the process of actuating the display elements. In such an implementation, the array of display elements 150 may include data memory elements for each display element, and the control matrix may include a global actuation interconnect for carrying trigger signals, from the common driver 138, to initiate simultaneous actuation of the display elements according to data stored in the memory elements.

In some implementations, the array of display elements 150 and the control matrix that controls the display elements may be arranged in configurations other than rectangular rows and columns. For example, the display elements can be arranged in hexagonal arrays or curvilinear rows and columns.

The host processor 122 generally controls the operations of the host device 120. For example, the host processor 122 may be a general or special purpose processor for controlling a portable electronic device. With respect to the display apparatus 128, included within the host device 120, the host processor 122 outputs image data as well as additional data about the host device 120. Such information may include data from environmental sensors 124, such as ambient light or temperature; information about the host device 120, including, for example, an operating mode of the host or the amount of power remaining in the host device's power source; information about the content of the image data; information about the type of image data; and/or instructions for the display apparatus 128 for use in selecting an imaging mode.

In some implementations, the user input module 126 enables the conveyance of personal preferences of a user to the controller 134, either directly, or via the host processor 122. In some implementations, the user input module 126 is controlled by software in which a user inputs personal preferences, for example, color, contrast, power, brightness, content, and other display settings and parameters preferences. In some other implementations, the user input module 126 is controlled by hardware in which a user inputs personal preferences. In some implementations, the user may input these preferences via voice commands, one or more buttons, switches or dials, or with touch-capability. The plurality of data inputs to the controller 134 direct the controller to provide data to the various drivers 130, 132, 138 and 148 which correspond to optimal imaging characteristics.

The environmental sensor module 124 also can be included as part of the host device 120. The environmental sensor module 124 can be capable of receiving data about the ambient environment, such as temperature and or ambient lighting conditions. The sensor module 124 can be programmed, for example, to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2B:
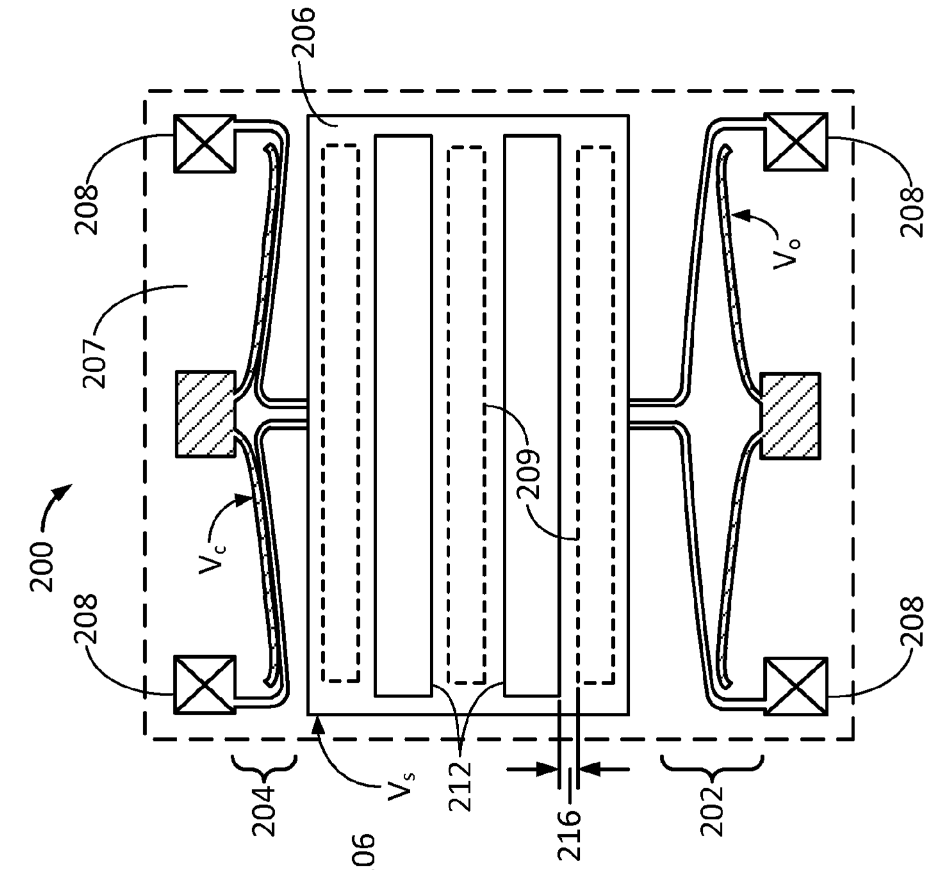
FIGS. 2A and 2B show views of an example dual actuator shutter assembly.
Figure 2A:
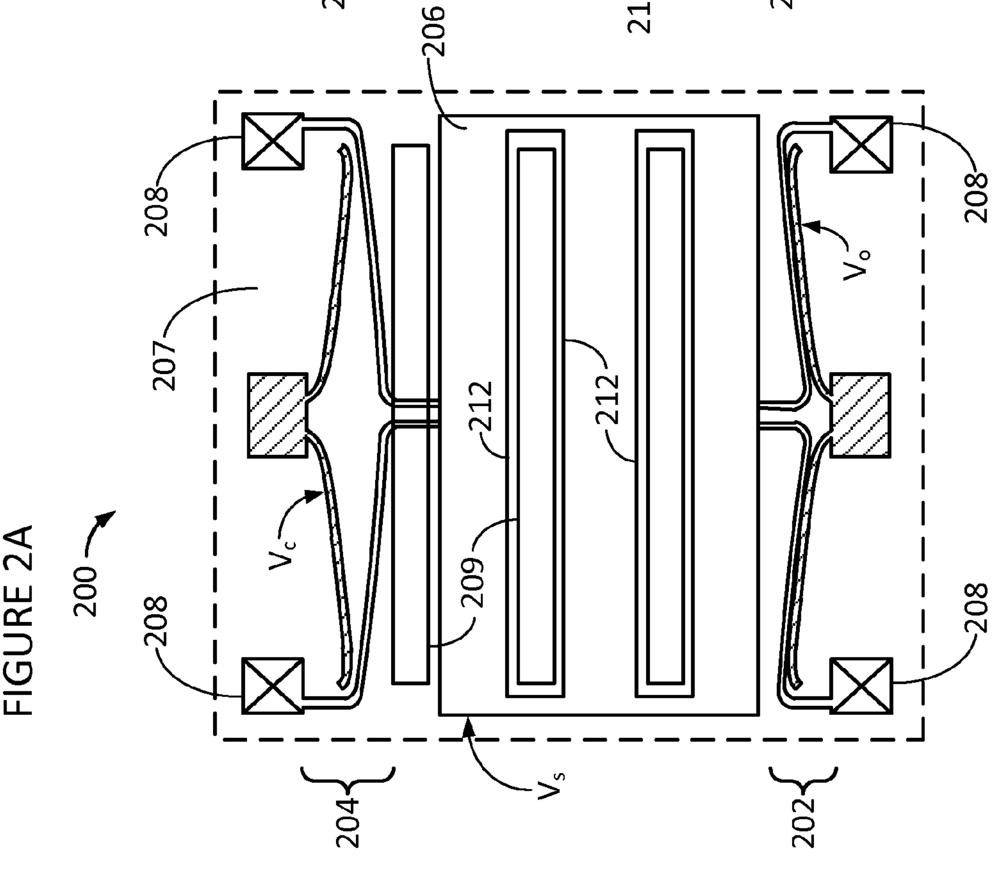

FIGS. 2A and 2B show views of an example dual actuator shutter assembly 200. The dual actuator shutter assembly 200, as depicted in FIG. 2A, is in an open state. FIG. 2B shows the dual actuator shutter assembly 200 in a closed state. The shutter assembly 200 includes actuators 202 and 204 on either side of a shutter 206. Each actuator 202 and 204 is independently controlled. A first actuator, a shutter-open actuator 202, serves to open the shutter 206. A second opposing actuator, the shutter-close actuator 204, serves to close the shutter 206. Each of the actuators 202 and 204 can be implemented as compliant beam electrode actuators. The actuators 202 and 204 open and close the shutter 206 by driving the shutter 206 substantially in a plane parallel to an aperture layer 207 over which the shutter is suspended. The shutter 206 is suspended a short distance over the aperture layer 207 by anchors 208 attached to the actuators 202 and 204. Having the actuators 202 and 204 attach to opposing ends of the shutter 206 along its axis of movement reduces out of plane motion of the shutter 206 and confines the motion substantially to a plane parallel to the substrate (not depicted).

In the depicted implementation, the shutter 206 includes two shutter apertures 212 through which light can pass. The aperture layer 207 includes a set of three apertures 209. In FIG. 2A, the shutter assembly 200 is in the open state and, as such, the shutter-open actuator 202 has been actuated, the shutter-close actuator 204 is in its relaxed position, and the centerlines of the shutter apertures 212 coincide with the centerlines of two of the aperture layer apertures 209. In FIG. 2B, the shutter assembly 200 has been moved to the closed state and, as such, the shutter-open actuator 202 is in its relaxed position, the shutter-close actuator 204 has been actuated, and the light blocking portions of the shutter 206 are now in position to block transmission of light through the apertures 209 (depicted as dotted lines).

Each aperture has at least one edge around its periphery. For example, the rectangular apertures 209 have four edges. In some implementations, in which circular, elliptical, oval, or other curved apertures are formed in the aperture layer 207, each aperture may have only a single edge. In some other implementations, the apertures need not be separated or disjointed in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through the apertures 212 and 209 in the open state, the width or size of the shutter apertures 212 can be designed to be larger than a corresponding width or size of apertures 209 in the aperture layer 207. In order to effectively block light from escaping in the closed state, the light blocking portions of the shutter 206 can be designed to overlap the edges of the apertures 209. FIG. 2B shows an overlap 216, which in some implementations can be predefined, between the edge of light blocking portions in the shutter 206 and one edge of the aperture 209 formed in the aperture layer 207.

The electrostatic actuators 202 and 204 are designed so that their voltage-displacement behavior provides a bi-stable characteristic to the shutter assembly 200. For each of the shutter-open and shutter-close actuators, there exists a range of voltages below the actuation voltage, which if applied while that actuator is in the closed state (with the shutter being either open or closed), will hold the actuator closed and the shutter in position, even after a drive voltage is applied to the opposing actuator. The minimum voltage needed to maintain a shutter's position against such an opposing force is referred to as a maintenance voltage $V_m$.

Figure 3:
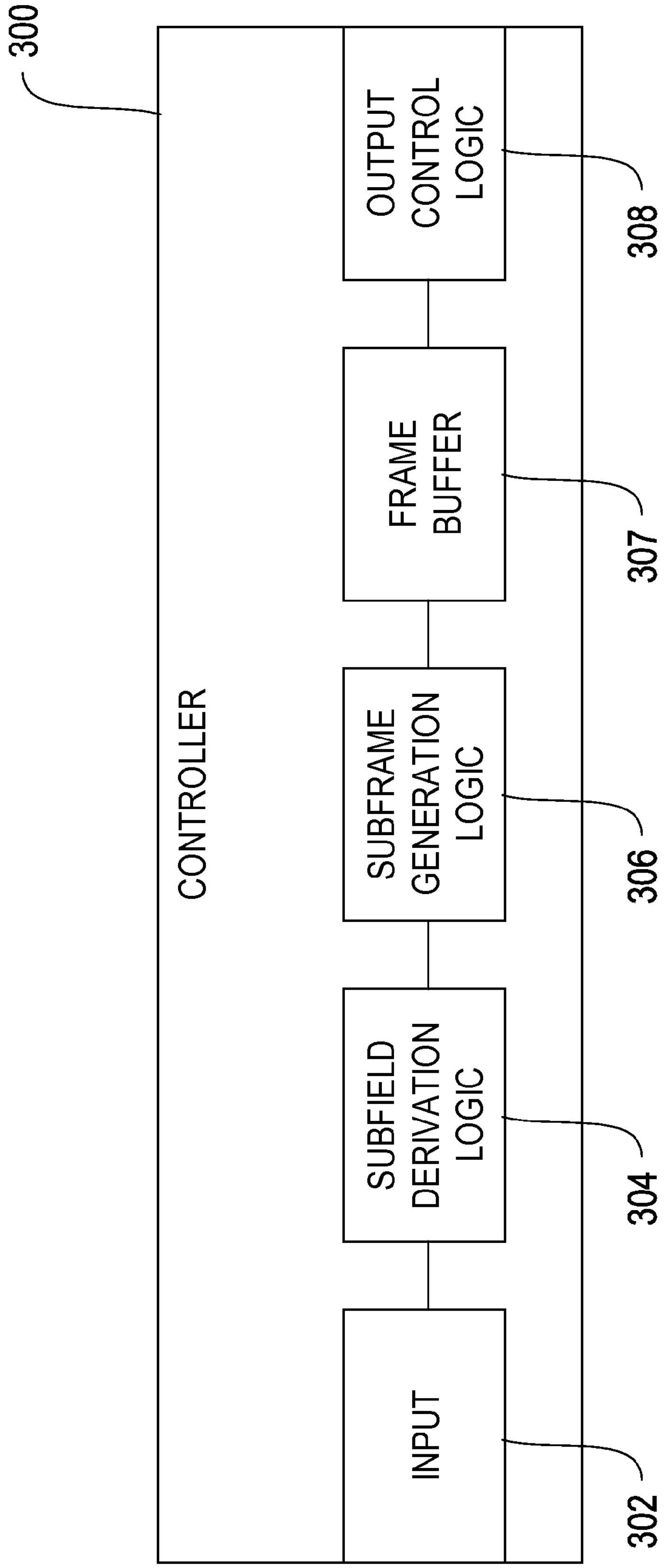
FIG. 3 shows a block diagram of an example architecture for a controller.

FIG. 3 shows a block diagram of an example architecture for a controller 300. For example, the controller 134 shown in FIG. 1B to control the display apparatus 128 may be built according to a similar architecture. In some other implementations, the controller 300 shown in FIG. 3 is implemented in the processor of a host device incorporating a display or in another standalone device that processes data for presentation on a display. The controller 300 includes an input 302, subfield derivation logic 304, subframe generation logic 306, a frame buffer 307, and output control logic 308. Together, the components carry out a process of forming an image.

The input 302 may be any type of controller input. In some implementations, the input is an external data port for receiving image data from an outside device, such as an HDMI port, a VGA port, a DVI port, a mini-DisplayPort, a coaxial cable port, or a set of component or composite video cable ports. The input 302 also may include a transceiver for receiving image data wirelessly. In some other implementations, the input 302 includes one or more data ports of a processor internal to a device. Such data ports may be configured to receive display data over a data bus from a memory device, a host processor, a transceiver, or any of the external data ports described above.

The subfield derivation logic 304, subframe generation logic 306, and the output control logic 308 can each be formed from a combination of integrated circuits, hardware, and/or firm ware. For example, one or more of the subfield derivation logic 304, subframe generation logic 306, and the output control logic 308 can be incorporated into or spread between one or more application specific integrated circuits (ASICs), field programmable gate arrays (FPGAs), or digital signal processors (DSPs). In some other implementations, some or all of the functionality of the subfield derivation logic 304, subframe generation logic 306, and the output control logic 308 may be incorporated into processor executable instructions which, when executed by a processor, such as a general purpose or special purpose processor, cause that processor to carry out the functionality described herein.

The frame buffer 307 can be any form of digital memory with read and write speeds sufficient to store and output image subframes fast enough to accommodate the processes disclosed herein. In some implantations, the frame buffer 307 is implemented as integrated circuit memory, such as DRAM or FLASH memory.

Figure 4:
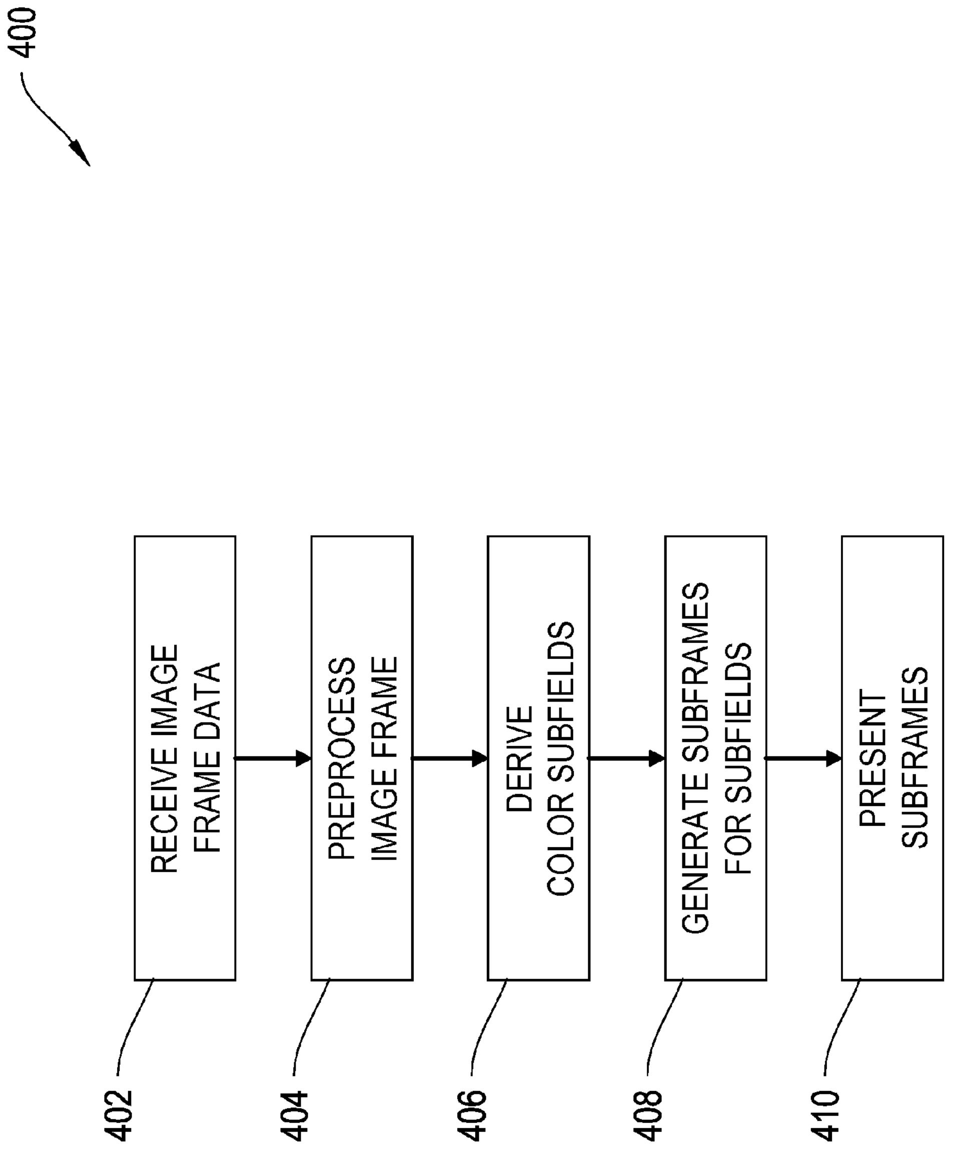
FIG. 4 shows a flow diagram of an example process of forming an image.

FIG. 4 shows a flow diagram of an example process 400 of forming an image. The process includes receiving image frame data (stage 402), preprocessing the image frame (stage 404), deriving color subfields for the image frame (stage 406), generating subframes for each color subfield (stage 408), and presenting the subframes (stage 410) using an array of display elements. Each of these stages, along with the components of the controller 300 shown in FIG. 3 are described further below.

Referring to FIGS. 1, 3 and 4, the input 302 is configured to receive image data for presentation on a display apparatus 128 (stage 402). The image data is typically received as a stream of intensity values for each of a set of input colors, such as red, green and blue, for each pixel in the display apparatus 128. The image data may be received directly from an image source, such from an electronic storage medium incorporated into the display apparatus 128. Alternatively, it may be received from a host processor 122 incorporated into the host device 120 in which the display apparatus 128 is built.

In some implementations, the received image frame data is preprocessed (stage 404) before the remainder of the image formation process 400 proceeds. For example, in some implementations, the image data includes color intensity values for more pixels or fewer pixels than are included in the display apparatus 128. In such cases, the input 302, the subfield derivation logic 304, or other logic incorporated into the controller 300 can scale the image data appropriately to the number of pixels included in the display apparatus 128. In some other implementations, the image frame data is received having been encoded assuming a given display gamma. In some implementations, if such gamma encoding is detected, logic within the controller 300 applies a gamma correction process to adjust the pixel intensity values to be more appropriate for the gamma of the display apparatus 128. For example, image data is often encoded based on the gamma of a typical liquid crystal (LCD) display. To address this common gamma encoding, the controller 300 may store a gamma correction lookup table (LUT) from which it can quickly retrieve appropriate intensity values given a set of LCD gamma encoded pixel values. In some implementations, the LUT includes corresponding RGB intensity values having a 16 bit-per-color resolution, though other color resolutions may be used in other implementations.

In some implementations, the controller 300 applies a histogram function to a received image frame as part of preprocessing the image (stage 404). The histogram function determines a variety of statistics about the image frame that can be used by other components of the controller 300. For example, in one implementation, the histogram function calculates for each FICC the mean intensity of the FICC in the image frame and the proportion of pixels that have a intensity value of 0. This histogram data can be used in selecting a FSCC as is described further below.

The controller 300 also can store a history of histogram data from frame to frame. In one implementation, histogram data from successive image frames are compared to determine if a scene change has occurred. Specifically, if the histogram data for a current frame differs beyond a threshold from the histogram data of a prior image frame, the controller determines that a scene change has occurred, and processes the current image frame accordingly. For example, in some implementations, in response to detecting a scene change, the controller 300 chooses a CABC process than it would not use absent a detected scene change.

In some implementations, image frame preprocessing (stage 404) includes a dithering stage. In some implementations, the process of de-gamma encoding an image results in 16 bit-per-color pixel values, even though the display apparatus 128 may not be configured for displaying such a large number of bits per color. A dithering process can help distribute any quantization error associated with converting these pixel values down to a color resolution available to the display, such as 6 or 8 bits per color.

In an example dithering process, the controller calculates for each pixel a difference between its initial larger number of bits representation and its quantized representation for each of the FICCs used by the display. For this example, assume the FICCs are red, green, and blue. The difference calculation can be represented as:

$$\{\Delta R,\Delta G,\Delta B\}=\{R,G,B\}-\{R^Q,G^Q,B^Q\},$$

where $R^Q$, $G^Q$, and $B^Q$ represent the quantized red, green, and blue intensity values for a pixel; R, G, and B represent the unquantized red, green, and blue intensity values; and ΔR, ΔG, and ΔB represent their respective differences. From these difference values, the controller calculates a resultant luminance error value, ΔL, for each pixel. The luminance error, ΔL, can be calculated as follows:

$$\Delta L=\Delta R\times Y_r^{gamut}+\Delta G\times Y_g^{gamut}+\Delta B\times Y_b^{gamut},$$

where $Y_r^{gamut}$ $Y_g^{gamut}$, and $Y_b^{gamut}$ represent the Y component of the tristimulus values of the red, green, and blue primaries used in the color gamut in which the display is operating. The controller 300 then identifies and applies appropriate increases to each pixel's red, green, and blue intensity values based on the determined luminance errors. In one implementation, the increases are identified using a LUT. After increasing the pixel intensity values based on the LUT, the controller 300 recalculates an updated difference between the pixels' initial unquantized value and their new quantized values. This difference for a pixel can be represented as:

$$\{\Delta R,\Delta G,\Delta B\}=\{R,G,B\}-\{R^Q+LUT_R(\Delta L),G^Q+\mathrm{LUT}_G(\Delta L),B^Q+\mathrm{LUT}_B(\Delta L)\},$$

where $\mathrm{LUT}_R(\Delta\mathrm{L})$, $\mathrm{LUT}_G(\Delta\mathrm{L})$, $\mathrm{LUT}_B(\Delta\mathrm{L})$ represents the values to increase the red, green, and blue intensities for the pixel obtained from the LUT based on the previously calculated luminance error, ΔL. These new difference values represent luminance better due to the addition of color, but now include color error, which is then distributed among neighboring pixels using an error distribution algorithm. In some implementations, the error is distributed by using a Floyd-Steinberg dithering algorithm using a hard-coded 5×5 kernel. In some other implementations, other kernel sizes, and/or different dithering algorithms or dither masks are employed. As a result, luminance errors resulting from quantization are corrected for by distributing additional luminance to the FICC color channels in a distributed fashion, providing a correction that is particularly challenging for the HVS to detect.

After preprocessing is complete, the subfield derivation logic 304 processes the received image data and converts it into color subfields (stage 406), which will then be displayed to a user to recreate the image encoded in the image data. In some implementations, the subfield derivation logic 304 may dynamically select one or more composite colors to use in addition to the input colors to form any given image frame. A composite color is a color formed from the combination of two or more input colors. For example, yellow is a composite of red and green, and white is a composite of red, green and blue. In some other implementations, the subfield derivation logic 304 is preconfigured to use two or more composite colors in addition to the input colors to form an image. In still some other implementations, the subfield derivation logic 304 is configured to determine for each image frame whether or not to use any composite colors to form the image depending on whether such use would result in a power savings. In each of these implementations, the subfield derivation logic 304 generates for each pixel being displayed a set of intensity values for each color used to form the image (referred to generally as a "contributing color"). Further details about each of these implementations is provided below.

The subframe generation logic 306 takes the color subfields derived by the subfield derivation logic 304 and generates a set of subframes (stage 408) that can be loaded into an array of display elements, such as the array 150 of display elements shown in FIG. 1B, to reproduce the image encoded in the received image data. For a binary display, in which each display element can only be placed into two states, ON or OFF, the subframe generation logic 306 generates a set of bitplanes.

Each bitplane identifies the desired states of each of the display elements in the array for a given subframe. To increase the number of grayscale values that can be achieved with a reduced number of bitplanes, the subframe generation logic 306 assigns each subframe a weight. In some implementations, each bitplane is assigned a weight according to a binary weighting scheme in which each successive subframe for a given color is assigned a weight that is twice that of the subframe having the next lowest weight, for example, 1, 2, 4, 8, 16, 32, etc. In some other implementations, weights are allocated to subframes associated with one or more colors according to a non-binary weighting scheme. Such non-binary weighting schemes may include multiple subframes having the same weight and/or subframes whose weights are more or less than twice the weight of subframe having the next lowest weight.

To generate a subframe (stage 408), the subframe generation logic 306 translates a color intensity value into a binary string of 1s and 0s, referred to as a codeword. The 1s and 0s represent the desired states of a given display element in each subframe for the color for the image frame. In some implementations, the subframe generation logic 306 includes or accesses a LUT that associates each intensity value with a codeword. The codewords for each color for each pixel are then stored in the frame buffer 307.

The output control logic 308 is configured to control the output of signals to a remainder of the components of a display apparatus to cause the subframes generated by the subframe generation logic 306 to be presented to a viewer (stage 410). For example, if used in the display apparatus 128 shown in FIG. 1B, the output control logic 308 would control the output of signals to the data drivers 132, scan drivers 130 and lamp drivers 148 shown in FIG. 1B to load the bitplanes into the display elements in the array 150, and then to illuminate the display elements with the lamps 140, 142, 144 and 146. The output control logic 308 includes scheduling data indicating the times at which each of the subframes generated by the subframe generation logic 308 should be output to the data drivers 132, when the scan drivers 130 should be triggered, and when each of the lamp drivers 148 should be triggered.

Figure 5:
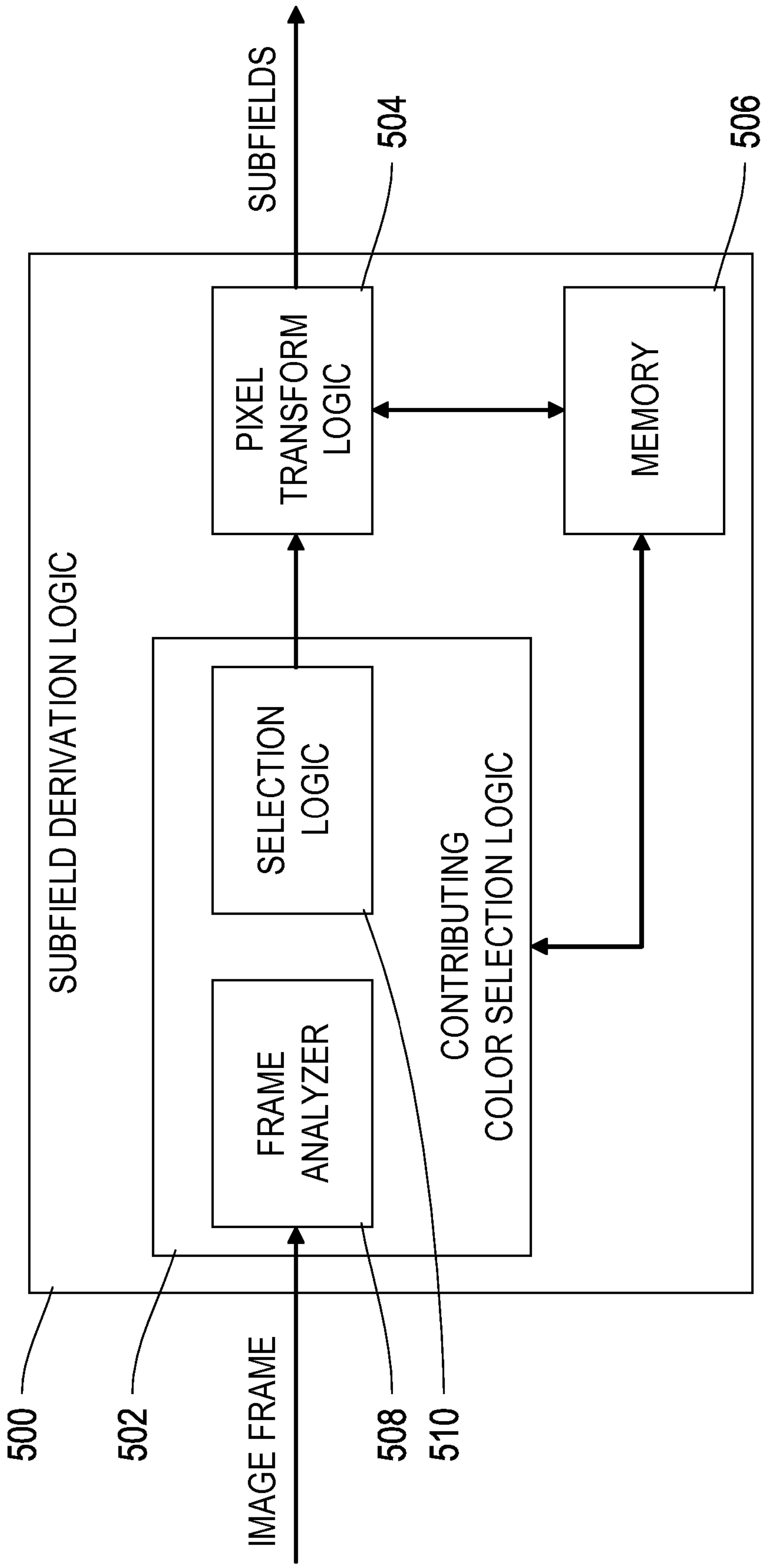
FIG. 5 shows a block diagram of an example subfield derivation logic.

FIG. 5 shows a block diagram of an example subfield derivation logic 500. The subfield derivation logic 500 includes a contributing color selection logic 502, pixel transform logic 504, and memory 506. The subfield derivation logic 500 is configured to generate a set of color subfields to present to a viewer for each received image frame using a dynamically selected FSCC along with a set of FICCs. One process for deriving such color subfields is shown in FIG. 6.

Figure 6:
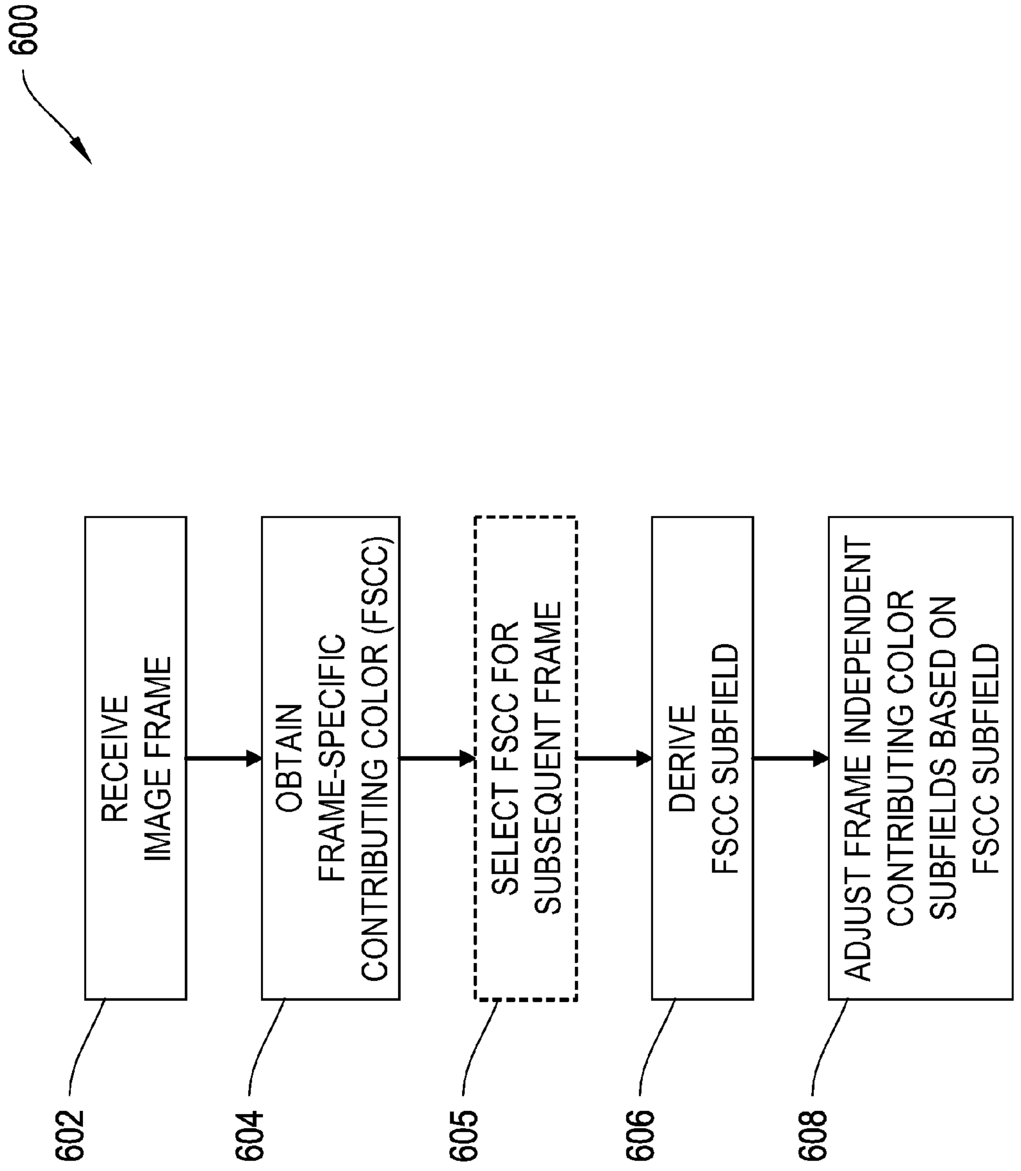
FIG. 6 shows a flow diagram of an example process of deriving color subfields.

FIG. 6 shows a flow diagram of an example process 600 of deriving color subfields. The process 600 may be used to perform stage 406 of the process of forming an image 400 shown in FIG. 4. The process 600 includes receiving an image frame (stage 602), obtaining a FSCC to use in forming the image (stage 604), deriving a color subfield for the FSCC for the image frame (stage 606), and then adjusting the color subfields of the FICCs based on the FSCC subfield pixel values (stage 608). Each of these stages, as well as the components of the subfield derivation logic 500 are described further below.

Referring to FIGS. 5 and 6, as set forth above, the process of deriving color subfields 600 begins with receiving an image frame (stage 602). The image frame may be received, for example, from the input 302 of the controller 300 shown in FIG. 3. The received image frame is passed to the contributing color selection logic 502.

The contributing color selection logic 502 is configured to obtain a FSCC to use in forming the image (stage 604). In some implementations, the contributing color selection logic 502 is configured to obtain the FSCC to use in forming an image using the image data associated with that image frame. In some other implementations, the contributing color selection logic 502 obtains the FSCC for an image frame based on image data associated with one or more previous image frames. In such implementations, the contributing color selection logic 502 analyzes a current image frame and stores a FSCC to be used in a subsequent image frame (stage 605) in memory 506 and obtains the FSCC to use in the current frame (stage 604) by retrieving from memory 506 the FSCC selection that was stored based on the prior image frame.

To select a FSCC (either for a current image frame or a subsequent image frame), the contributing color selection logic 502 includes a frame analyzer 508 and selection logic 510. In general, the frame analyzer 508 analyzes an image frame to determine its overall color characteristics, and based on its output, the selection logic 510 selects a FSCC. Example processes by which the contributing color selection logic 502 can select a FSCC are described further below in relation to FIGS. 7-9.

Figure 7:
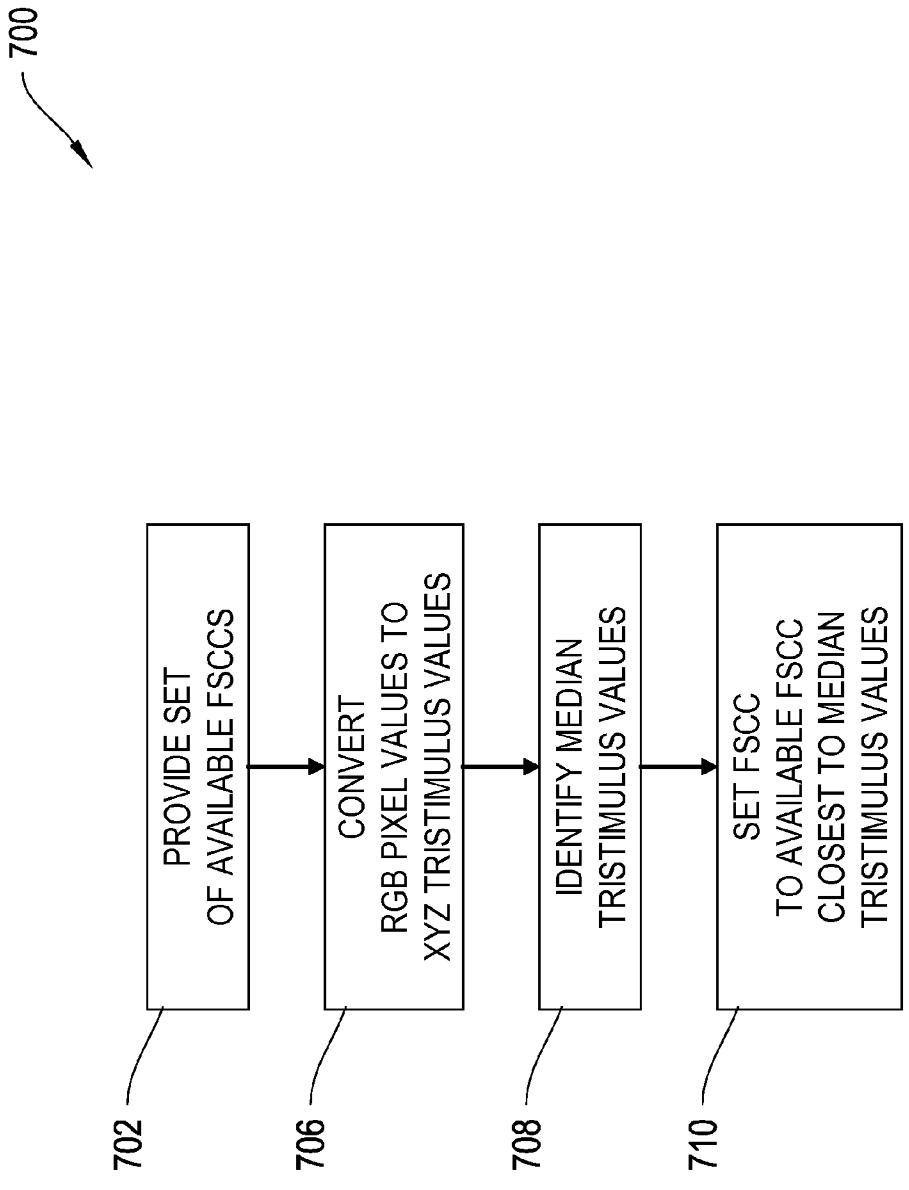
FIG. 7 shows a flow diagram of an example process of selecting a frame-specific contributing color (FSCC).

FIG. 7 shows a flow diagram of an example process 700 of selecting a FSCC. The FSCC selection process 700 is an example of a FSCC selection process suitable for execution by the contributing color selection logic 502. The process 700 includes providing the contributing color selection logic 502 with a set of available FSCCs to select from (stage 702), converting received image data into XYZ tristimulus values for processing (stage 706), identifying a color corresponding to the medians of the tristimulus values (stage 708), and setting the FSCC to the available FSCC closest to the color corresponding to the set median tristimulus values (stage 710).

Referring to FIGS. 5 and 7, the process 700 assumes that the contributing color selection logic 502 is configured to select only one of a predetermined set of available FSCCs to use in any given image frame. Selecting a FSCC from a predetermined set of composite colors can simplify both the FSCC selection stage (stage 708) as well as the FICC subfield adjustment stage (stage 608) shown in FIG. 6. Thus, the process 700 begins with providing the set of available FSCCs to the contributing color selection logic 502 (stage 702).

Most image data is received in the form of red, green, and blue pixel values. Thus, in some implementations, a display incorporating the subfield derivation logic 500 including the contributing color selection logic 502, uses red, green, blue, and in some cases, white LEDs to illuminate corresponding subfields associated with each image frame. The use of the red, green and blue is frame-independent, and such colors are referred to as FICCs. In some implementations, the provided FSCCs include colors formed from equal combinations of two or more of the FICCs. For example, the available FSCCs may include yellow (formed from the combination of red and green), cyan (formed from the combination of green and blue), magenta (formed from the combination of red and blue), and white (formed from the combination of red, green and blue). Such FSCCs can be generated by illuminating two or more of the display's LEDs, or, for example, in the case of white, by a separate LED designed to output the FSCC directly.

Selection of a FSCC can be more effective when evaluating a linear color space. The RGB color space is non-linear, but the XYZ color space is. Thus, the frame analyzer 508, processes the values of each pixel in a pixel frame to convert them into the XYZ color space (stage 706). The conversion is carried out through matrix multiplication of a matrix defined by the RGB intensity values for a pixel $$\begin{bmatrix} R \\ G \\ B \end{bmatrix}$$

with an XYZ transform matrix M, where:

$$M = \begin{bmatrix} X_r^{gamut} & X_g^{gamut} & X_b^{gamut} \\ Y_r^{gamut} & Y_g^{gamut} & Y_b^{gamut} \\ Z_r^{gamut} & Z_g^{gamut} & Z_b^{gamut} \end{bmatrix} = \begin{bmatrix} \frac{x_r^{gamut}}{y_r^{gamut}} S_r & \frac{x_g^{gamut}}{y_g^{gamut}} S_g & \frac{x_b^{gamut}}{y_b^{gamut}} S_b \\ \frac{1 - x_r^{gamut} - y_r^{gamut}}{y_r^{gamut}} S_r & \frac{1 - x_g^{gamut} - y_g^{gamut}}{y_g^{gamut}} S_g & \frac{1 - x_b^{gamut} - y_b^{gamut}}{y_b^{gamut}} S_b \end{bmatrix}$$

and $X_r^{gamut}$, $Y_r^{gamut}$, and $Z_r^{gamut}$ correspond to the XYZ tristimulus values of the red primary of the color gamut being used, $X_g^{gamut}$, $Y_g^{gamut}$, and $Z_g^{gamut}$ correspond to the XYZ tristimulus values of the green primary of the color gamut being used, and $X_b^{gamut}$, $Y_b^{gamut}$, and $Z_b^{gamut}$ correspond to the XYZ tristimulus values of the blue primary of the color gamut being used. Similarly, $x_r^{gamut}$, $y_r^{gamut}$, $x_g^{gamut}$, $y_g^{gamut}$, $x_b^{gamut}$, $y_b^{gamut}$ correspond to the x and y coordinates of the red, green, and blue primaries, respectively, in the CIE color space. $S_r$, $S_g$, and $S_b$ correspond to the relative intensities of the red, green, and blue primaries in relation to the formation of the gamut's white point.

Once the pixel values for an image frame are converted to the XYZ color space, the frame analyzer 508 determines the median values of each of the X, Y and Z parameters of the image frame. In some implementations, the frame analyzer 508 calculates the median for each parameter across all pixel values of the image frame. In some other implementations, the frame analyzer 508 takes into account only those pixels that have luminances (i.e., values of Y) greater than a threshold luminance level, such as the mean Y value for the image frame. That is, in such implementations, the frame analyzer calculates:

$$\{X_{median}, Y_{median}, Z_{median}\} = \{\text{median}(X), Y > Y_{mean}, \text{median}(Y), Y > Y_{mean}, \text{median}(Z), Y > Y_{mean}\}.$$

In some implementations, a histogram function is used to determine the median values. Using the median XYZ values for the image frame, the selection logic 510 selects as the FSCC, the available FSCC that is closest, in the XYZ color space, to the color corresponding to the median XYZ values (referred to as the median tristimulus color or MTC) calculated by the frame analyzer 508. In some other implementations, the selection logic 510 selects the FSCC by identifying the available FSCC color that is closest to the MTC in the CIE color space. After selecting the FSCC, the contributing color selection logic 502 converts the selected FSCC back to the RGB color space and outputs its RGB intensity values to the pixel transform logic 504.

In some other implementations, the selection logic 510 includes one or more distance thresholds associated with the available FSCCs, either individually or collectively. For example, in some implementations, if the MTC is not within a predetermined distance of any available FSCCs, the selection logic 510 decides to forgo selecting a FSCC. In some other implementations, the selection logic 510 maintains separate distance thresholds for each available FSCC. In such implementations, the selection logic 510 compares the distance between the MTC and the closest available FSCC. If the distance is greater than the threshold associated with that available FSCC, then the selection logic 510 decides to forgo selecting a FSCC. In some implementations, distance is calculated directly as the Euclidean distance in the XYZ color space. In some other implementations, the distance is calculated as the Euclidean distance of the colors based on their corresponding x and y coordinates in the CIE color space.

In some other implementations, the selection logic 510 favors colors that are perceived as brighter by the HVS when making the FSCC selection. For example, if the MTC for an image frame falls equidistant from two available FSCCs, such as yellow and cyan, the selection logic will select yellow as the FSCC. In some such implementations, the distances to each FSCC are weighted by the inverse of the relative perceived brightnesses of the respective FSCCs in comparison to the other FSCCs. For example, the distance between the MTC color and yellow is weighted by a factor of 0.5, whereas the distances to cyan and magenta are each weighted by a factor of 1.0. Doing so can help mitigate image artifacts, because generating brighter colors sequentially is more likely to cause image artifacts, such as CBU.

Figure 8A:
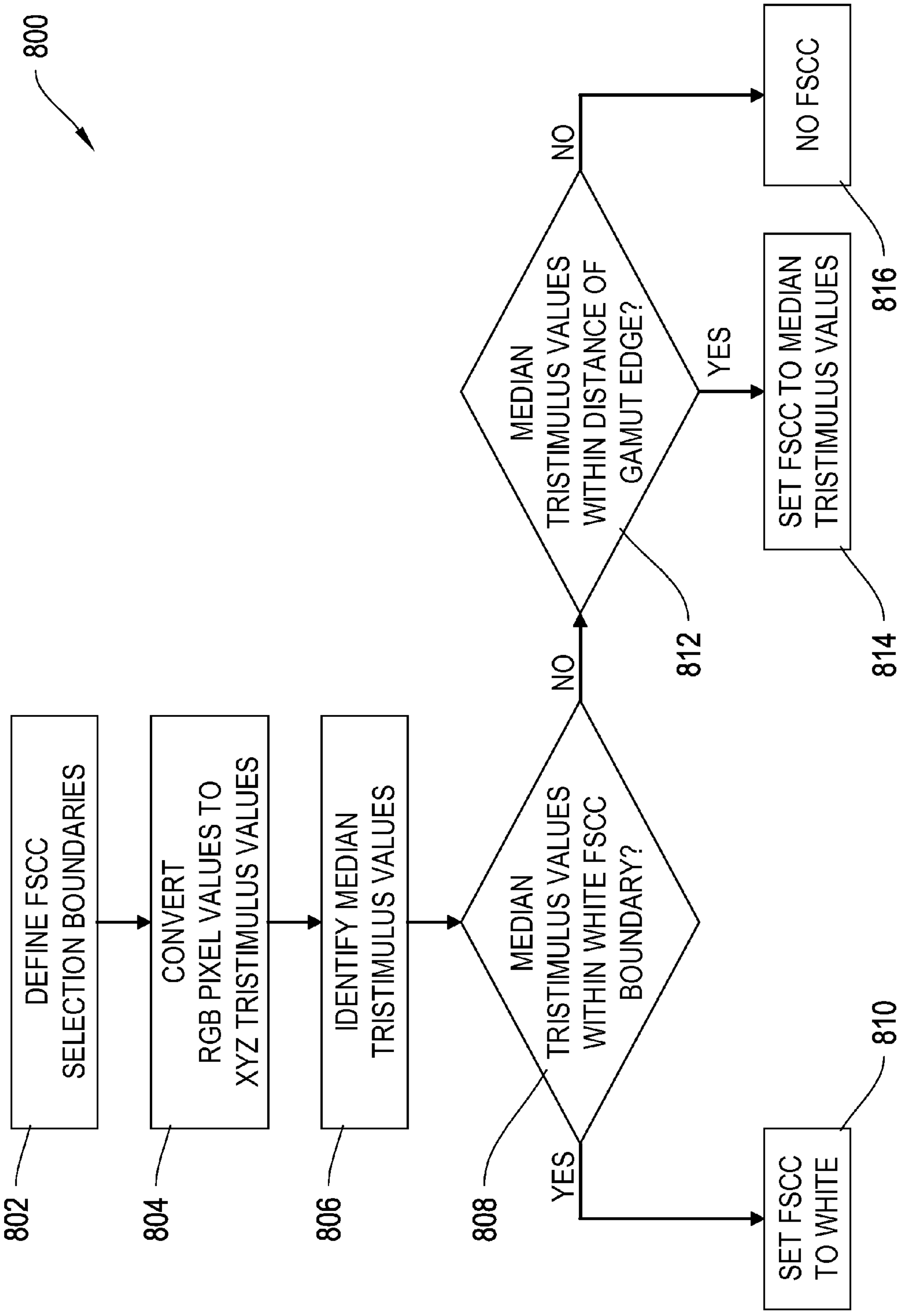
FIGS. 8A and 8B show flow diagrams of additional example processes for selecting a FSCC.
Figure 8B:
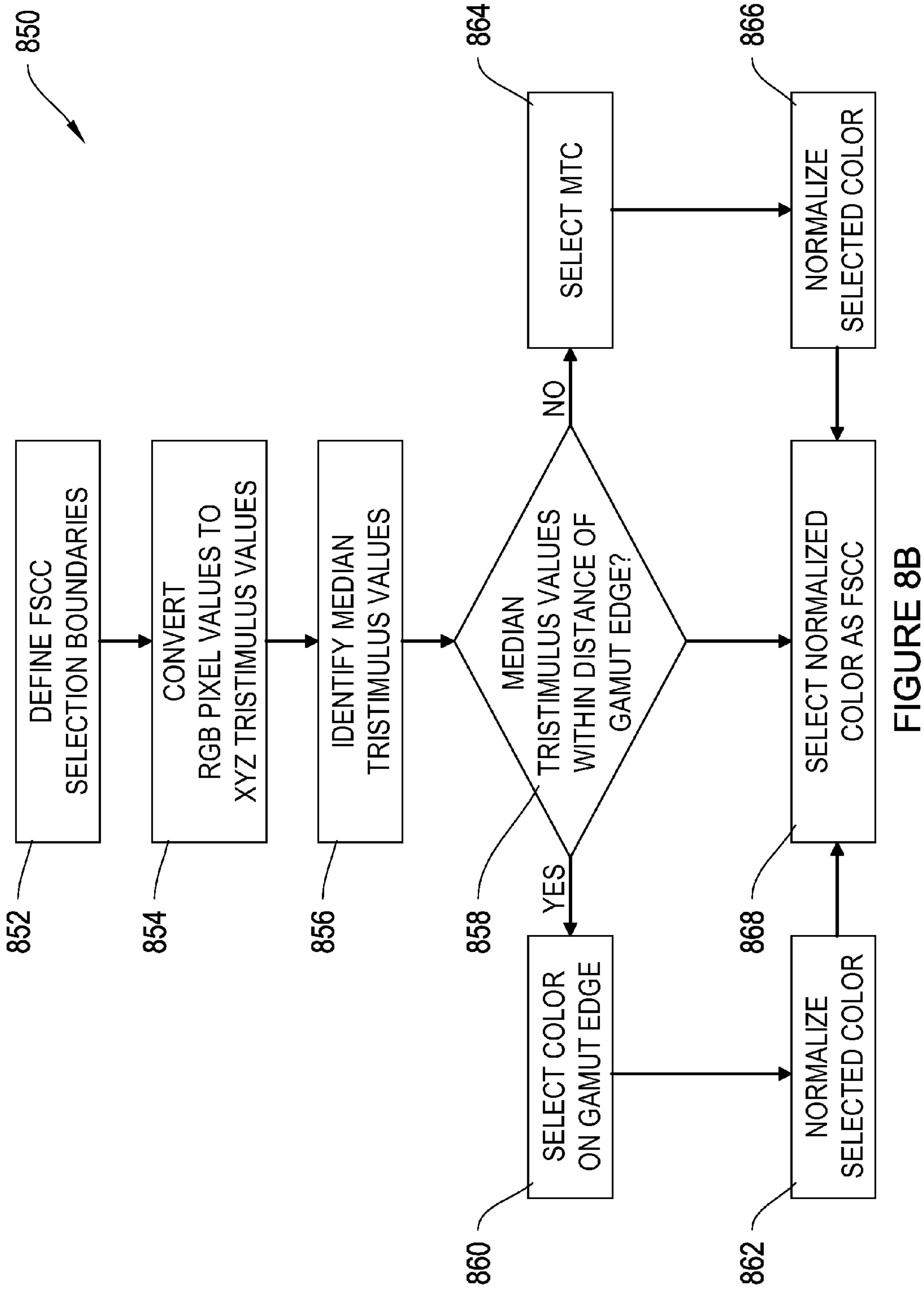

FIGS. 8A and 8B show flow diagrams of additional example processes 800 and 850 for selecting a FSCC. Like the FSCC selection process 700 shown in FIG. 7, the FSCC selection processes 800 and 850 are suitable for execution by the contributing color selection logic 502 shown in FIG. 5. However the FSCC selection processes 800 and 850 provide greater flexibility in selecting a FSCC. Instead of providing only a preselected set of available FSCCs to chose from (stage 702), as was done in the process 700 shown in FIG. 7, the FSCC selection process 800 allows the contributing color selection logic 502 to select between white and any color that is relatively near to the boundaries of the available color gamut of the display to use as the FSCC. The FSCC selection process 850 also allows for the selection of a broad range of colors as a FSCC.

More particularly, the FSCC selection process 800 includes defining FSCC selection boundaries (stage 802), converting received pixel values into XYZ tristimulus values (stage 804), identifying an MTC (stage 806), and determining whether the MTC is within a defined white FSCC boundary (stage 808). If the MTC is within the defined white FSCC boundary, the process sets the FSCC to white (stage 810). If MTC is outside of the white FSCC boundary, the process 800 continues with determining whether the MTC is within a predetermined distance of the edges of the color gamut (stage 812). If the MTC is within the predetermined distance, the process sets the FSCC to the MTC (stage 814). If not, the process refrains from setting a FSCC (stage 816).

Figure 9:
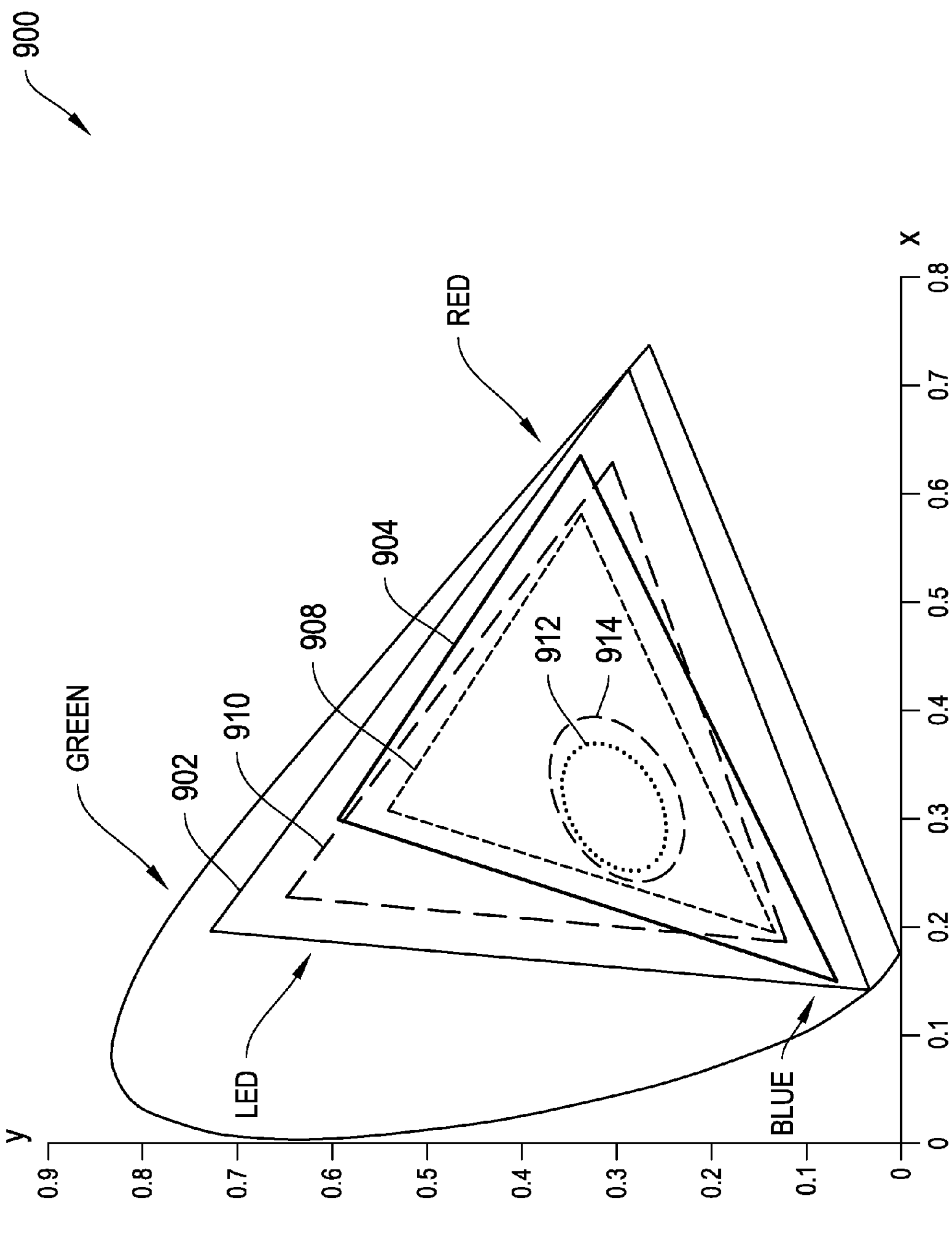
FIG. 9 shows two color gamuts depicting example FSCC selection criteria for use in the processes shown in FIGS. 8A and 8B.

Referring to FIGS. 5 and 8A, as set forth above, the FSCC selection process 800 begins with identifying which colors can be selected as a FSCC by defining boundaries within a color space that define the selectable colors (stage 802). FIG. 9 shows two color gamuts 902 and 904 depicting example FSCC selection criteria for use in the process of FIG. 8. Specifically, FIG. 9 shows both the Adobe RGB color gamut 902 and the sRGB color gamut 904. Each color gamut 902 or 904 is identified by a corresponding triangle depicted in solid lines within the CIE color space. The vertices of the respective triangles correspond to the highest saturation of a given primary color available in the color space.

Within each color gamut, FIG. 9 shows a second triangle shown in broken lines that defines the boundaries of a FSCC selection region. The triangle 908 in the shorter broken lines defines which non-white colors may be selected as the FSCC for an image frame, assuming operation within the sRGB color gamut. That is, when using the process 800 to select a FSCC while operating within in the sRGB color gamut, any color with x, y color coordinates within the region located between the triangle 908 and the outer boundary of the sRGB color gamut depicted by the triangle 904 can be selected as a FSCC. Similarly, the triangle 910, depicted in longer broken lines, defines the available non-white colors available for use as a FSCC assuming operation within the Adobe RGB color gamut.

FIG. 9 also shows two ovals, 912 and 914. The oval 912, depicted in the shorter broken lines, defines a white FSCC selection zone during operation within the sRGB color gamut. If the MTC falls within the oval 912, the FSCC selection process 800 defaults to using white as the FSCC. The oval 914 similarly defines a white FSCC selection zone during operation in the Adobe RGB color gamut.

The exact positions of the triangles 908 and 910 and the ovals 912 and 914 are merely illustrative in nature. Their exact position within their corresponding color gamuts may vary from display to display based on specific LEDs used in the display and the overall optical and power consumption profiles of the display. Similarly, the boundaries need not be defined by triangles. In some other implementations, the boundaries can be defined by other polygons, irregular shapes, as well as closed curves. In some implementations, the boundary of the color space usable by a FSCC is defined by a percentage, such as 5%, 10%, 20% or even up to 30%, of the total distance between any point on the edge of the color gamut and the color gamut white point. Similarly, the white FSCC selections zones 912 and 914 can take any closed shape deemed appropriate for the particular display.

After the FSCC boundaries are defined (stage 802), the contributing color selection logic 502 converts the RGB pixel values of the pixels in a received image frame into their corresponding XYZ tristimulus values (stage 804). The conversion can be carried out in the same fashion described above in relation to stage 706 of the FSCC selection process 700 shown in FIG. 7. The contributing color selection logic 502 then identifies the median tristimulus values for the image frame and the corresponding MTC (stage 806) as described above in relation to stage 708 of the FSCC selection process 700.

Continuing to refer to FIGS. 5 and 8, the selection logic 510 of the contributing color selection logic 502 determines whether the MTC falls within the previously defined white FSCC selection region boundaries (stage 808). If the MTC falls within the white FSCC selection region, the selection logic 510 selects white as the FSCC (stage 810). If the MTC falls outside of those boundaries, the selection logic 510 determines whether the MTC falls close enough to the edges of the color gamut to be within the non-white FSCC selection region (stage 812). If the MTC falls within that region, the selection logic 510 sets the FSCC to the color corresponding to the MTC (stage 814), converts the selected color back to the RGB color space and outputs its RGB intensity values to the pixel transform logic 504. Otherwise, the selection logic 510 refrains from selecting a FSCC (stage 816).

The FSCC selection process 850 shown in FIG. 8B is similar to the FSCC selection process 800. However, instead of allowing selection of non-white colors within a gamut boundary region, the FSCC selection process 850 allows selection of any color on the boundary itself, or outside of the boundary region, as a FSCC.

Referring to FIGS. 5 and 8B, the FSCC selection process 850 includes defining FSCC selection boundaries (stage 852), converting received pixel values into XYZ tristimulus values (stage 854), identifying an MTC (stage 856), and determining whether the MTC falls within a boundary region adjacent the edges of the display color gamut (stage 858). If the MTC falls within the boundary region, the process 850 selects a color on the edge of the color gamut (stage 860) near the MTC and normalizes the selected edge color (stage 862). The normalized color is selected to serve as the FSCC (stage 868). If the MTC falls outside of the boundary region, the process 850 selects the MTC (stage 864), normalizes the MTC (stage 866) and selects the normalized MTC as the FSCC (stage 868).

More particularly, the FSCC selection process 850 begins in much the same way as the FSCC selection process 800. The contributing color selection logic 502 defines the FSCC selection boundaries in a fashion similar to the way it did with respect to stage 802 of the FSCC selection process 800 (stage 852). In contrast, though, in defining the FSCC selection boundaries (stage 852) in the FSCC selection process 850, the contributing color selection logic 502 only defines an outer boundary region near the edges of the color gamut and does not define a separate white-FSCC selection region. Moreover, the region around the edges of the gamut, instead of defining a region of colors that can be included in a set of potential FSCCs, as in the FSCC selection process 800, the defined region defines a set of colors that are excluded from selection, as described further below.

The contributing color selection logic 502 then proceeds to convert the pixel values of an image frame into the corresponding XYZ tristimulus values (stage 854) and selects a MTC (stage 856) in the same fashion it did in stage 804 and 806 of the FSCC selection process 800.

The selection logic 510 of the contributing color selection logic 502 then determines whether the MTC falls within the boundary region defined in stage 852 (stage 858). If the MTC falls within the boundary, the selection logic selects a color on the edge of the color gamut to replace the MTC (stage 860). The selection logic can identify the color on the edge of the gamut in a variety of ways. In some implementations, the selection logic 510 identifies the color in the CIE color space on the edge of the color gamut having the smallest Euclidean distance to the MTC. In some other implementations, the selection logic 510 converts the MTC to the RGB color space and reduces the RGB component of the MTC with the smallest magnitude to 0. This effectively results in a color on the edge of the color gamut in the CIE color space.

After selecting a color on the edge of the CIE color space, the selection logic normalizes the RGB representation of the color such that the largest RGB component of the selected color is increased to 255 (stage 862) and uses the normalized color as the FSCC (stage 868). For example, the color Red 127, Green 60, and Blue 0 would be normalized to Red 255, Green 120, and Blue 0. More generally, the FSCC would be equal to:

$$FSCC = \left\{R * \frac{255}{\mathrm{Max}(R, G, B)}, G * \frac{255}{\mathrm{Max}(R, G, B)}, B * \frac{255}{\mathrm{Max}(R, G, B)}\right\}.$$

If the selection logic 510 determines that the MTC is outside of the boundary region adjacent to the edges of the color gamut (at stage 858), the selection logic 510 selects the MTC (stage 864), normalizes the MTC (stage 866) as described above, and uses the normalized MTC as the FSCC (stage 868).

Various aspects of the above described processes can vary in different implementations. For example, in some implementations, if the MTC falls near the gamut white point—for example, within a white FSCC selection region or is closer to the white point than to any boundary of the color gamut—before selecting pure white or a near white as the FSCC, the selection logic 510 determines if there are particular concentrations of any colors in the image frame that are particularly prone to causing image artifacts if presented with a white or near white FSCC. Yellow and magenta are two such colors.

Yellow and magenta pixels can be identified heuristically by evaluating the histogram data generated for an image frame during preprocessing. Yellow can be detected, in some implementations, by identifying a non-negligible percentage (such as greater than about 1-3%) of pixels in an image frame having a 0 blue intensity, coupled with the image frame including at least a modest mean blue value, such as a mean value greater than about 20% or about 30% of the maximum blue value. Magenta can similarly be detected by identifying a non-negligible percentage of the pixels in the image frame having a 0 green intensity, coupled with the image frame having at least a modest mean green intensity (such as greater than about 30% or 40% of the maximum green value). If the selection logic 510 determines that there are likely a sufficient number of yellow or magenta pixels, the selection logic 510 selects a FSCC that lacks a blue or green component, respectively. For example, the selection logic can convert the MTC into the RGB color space and reduce the blue or green component of the MTC to 0. In some other implementations, upon detecting sufficient yellow content, the selection logic 510 chooses white as the FSCC, but uses a fractional replacement strategy (described further below) when generating an FSCC subfield to reduce the intensity of the white FSCC, for example by one half, one quarter, one eighth, or any other factor greater than 0 and less than 1.

In some implementations of the FSCC selection process 800 shown in FIG. 8, if the MTC falls within the non-white FSCC selection region, the selection logic 510 selects a color that omits any contribution from the contributing color furthest from the MTC. For example, were the selection logic 510 to identify a MTC within the non-white FSCC selection region near the boundary of the color gamut between the red and blue vertices, the selection logic would select the color on the boundary between red and blue vertices closest to the MTC as the FSCC. Doing so effectively removes any green component from the selected FSCC. Similarly, if the MTC falls within the non-white FSCC selection region between the red and green vertices, the selection logic 510 would select as the FSCC a color on the boundary of the gamut between those vertices, effectively eliminating any blue content in the FSCC. Alternatively, the selection logic 510 could obtain a similar result by converting the MTC to the RGB color space and reducing the smallest RGB component value to 0.

In some other implementations, the selection logic 510 will always select the MTC as a FSCC, regardless of where it falls in the color gamut.

Referring back to FIGS. 5 and 6, in implementations in which the subfield derivation logic 500 determines a FSCC to use for a subsequent image frame based on a current image frame, the subfield derivation logic 500 retrieves a previously stored FSCC from memory and stores the newly selected FSCC back to memory 506 (stage 605). In implementations in which subfield derivation logic 500 uses a FSCC for a current image frame based on the data included in the current image frame, the subfield derivation logic 500 proceeds directly with the subsequent stage of the subfield derivation process 600 using the FSCC selected by the contributing color selection logic 502.

Still referring to FIGS. 5 and 6, assuming the contributing color selection logic 502 obtained a FSCC to use for the image frame (either from memory or based on the current image frame), the subfield derivation logic 500 proceeds with deriving a FSCC subfield (stage 606). In one implementation, the pixel transform logic 504 of the subfield derivation logic 500 creates the FSCC subfield by, for each pixel in the image frame, identifying an intensity value that corresponds to the maximum light intensity that could be output for that pixel using the FSCC without altering the chromaticity of the pixel. Those values are stored as the FSCC subfield.

Such a FSCC subfield derivation strategy is referred to a "maximum replacement strategy," and the values resulting from such a strategy are referred to as "maximum replacement intensity values." In some other implementations, the subfield derivation logic 500 employs a different strategy in which, for each pixel, only a fraction of the maximum replaceable intensity values are allocated to the FSCC subfield. For example, the subfield derivation logic, in some implementations, assigns an intensity to each pixel in the FSCC subfield equal to between about 0.5 and about 0.9 times the maximum replacement intensity value for that pixel, though other fractions less than about 0.5 and between about 0.9 and 1.0 also can be employed. This strategy is referred to as a fractional replacement strategy.

After the FSCC subfield is derived (stage 606), the pixel transform logic 504 of the subfield derivation logic 500 adjusts a set of FICC subfields based on the FSCC subfield (stage 608). Depending on the FSCC selected, two or more of the FICC subfields may need to be adjusted. More particularly, the pixel transform logic 504 adjusts the pixel intensities of the FICC subfields associated with the FICCs that combine to form the FSCC. For example, assume the FICCs include red, green and blue. If Cyan was selected as the FSCC, the pixel transform logic 504 would adjust the pixel intensity values for the blue and green subfields. If yellow was selected as the FSCC, the pixel transform logic 504 would adjust the pixel intensity values of the red and green subfields. If white, or any other color spaced away from the edge of the color gamut, was selected as the FSCC, the pixel transform logic 504 would adjust the pixel intensity values of all three FICC subfields.

The initial FICC subfields are derived from the image data for the image frame received from the controller input 302 shown in FIG. 3, after any preprocessing that may have been necessary (see stage 404 shown in FIG. 4) has been completed. To adjust the FICC subfields, the pixel transform logic 504 starts with the initial FICC subfields and subtracts from the intensity values for each pixel in the corresponding FICC subfields the intensity of that FICC used to generate the respective pixel intensity for the pixel in the FSCC subfield.

Consider the following example for a single pixel, where the contributing color selection logic 502 has selected yellow as the FSCC. Assume the intensity values for the pixel in the FICC subfields are Red 200, Green 100 and Blue 20. Yellow is formed from equal parts of red and green. Thus, if a maximum replacement strategy were utilized (as described above), the pixel transform logic 504 would assign a value of 100, the highest value that can be equally subtracted from the red and green subfields, to the yellow subfield for the pixel. It would then reduce the values in the red and green subfields for that pixel accordingly to Red 100 and Green 0.

Consider another example in which the FSCC is orange, a color having unequal contributing color intensities. An example orange color has RGB intensity values of Red 250, Green, 125 and Blue 0. In this example, the intensity of red in the FSCC is twice that of green. Thus, when adjusting the pixels intensity values in the red and green subfields, the pixel transform logic 504 adjusts the intensity according to the same proportional relationship. Using the same example pixel, i.e., a pixel having FICC subfield values of Red 200, Green 100 and Blue 20, the pixel transform logic 504 could reduce the intensity values of both the red and green subfields for the pixel down to 0. The resulting subfield intensity values for the pixel would be Red 0, Green 0, Blue 20 and Orange 200.

Represented mathematically, for a pixel having initial FICC intensity values of R, G, and B, the pixel transform logic 504 sets the updated intensity values, R', G', and B' in the respective FICC subfields as follows:

$$\begin{bmatrix} R' \\ G' \\ B' \end{bmatrix} = \begin{bmatrix} R \\ G \\ B \end{bmatrix} - x \begin{bmatrix} x_R \\ x_G \\ x_B \end{bmatrix},$$

where x is the intensity value of the FSCC for the pixel, and $x_R$, $x_G$, and $x_B$ correspond to the relative intensities of each of the FICCs, red, green, and blue, in the FSCC, where each of R, G, B, x, $x_R$, $x_G$, and $x_B$ are represented by values ranging from 0 to 1. The updated R', G', and B' values can then be converted back to corresponding gray scale values for display purposes by multiplying them by the total number of gray scale levels being used by the display (for example, 255, for a display using an 8 bits-per-color gray-scale process), and rounding to the nearest integer value.

As indicated above, in some other implementations, the pixel transform logic 504 may employ a strategy that does not maximize the replacement of FICCs with the FSCC. For example, the pixel transform logic may replace only 50% of the maximum replacement value for a pixel. In such an implementation, the same example pixel may be displayed using the following intensity values: Yellow 50, Red 150, Green 50 and Blue 20.

In some other implementations, a reduced-subframe replacement strategy is used to allocate pixel intensity values to the FSCC subfield. In such implementations, the controller in which the subfield derivation logic 500 is incorporated is configured to generate fewer subframes for the FSCC than for the FICCs. That is, the controller displays FICCs using a full complement of bitplanes having relative weights beginning at 1 and ranging up to 64 or 128. However, for the FSCC subfield, the controller only generates and causes to be displayed a limited number of higher weighted subframes. The FSCC subframes are generated with higher weights to maximize the luminance replacement provided by the FSCC, without employing a larger number of additional subframes.

For example, in some implementations, the controller is configured to generate between 6-10 subframes for each of the FICC subfields and only 2 or 3 higher-weight subframes for the FSCC subfield. In some implementations, the weights of the FSCC subframes are selected from the highest significance weights of a binary sub-frame weighting scheme. For an 8-bit-per-color gray scale process, the controller would generate three FSCC subframes having weights of 32, 64 and 128. The weights of the subframes for the FICCs may or may not be assigned according to a binary weighting scheme. For example, the subframe weights for the FICCs may be selected to include some degree of redundancy to allow multiple representations of at least some gray scale values. Such redundancy aids in reducing certain image artifacts, such as dynamic false contouring ("DFC"). Thus, the controller may utilize 9 or 10 subframes to display an 8-bit FICC value.

In implementations in which fewer FSCC subframes are used, the pixel transform logic 504 cannot assign intensity levels to the FSCC subfield with as a high granularity as it does in implementations in which it employs a full complement of FSCC subframes. Thus, when determining the FSCC intensity levels for the pixels in a FSCC subfield, the pixel transform logic 504 assigns each pixel a value equal to the maximum FSCC intensity that could used to replace FICC light intensity, and then rounds the value down to the closest intensity level that can be generated given the reduced number of subframes and their corresponding weights.

Consider a pixel having FICC intensity values of Red 125, Green 80, and Blue 20 being processed by a controller that uses FSCC subframe weights of 128, 64, and 32. In this example, assume the contributing color selection logic 502 selects Yellow as the FSCC. The subfield derivation logic 206 would identify a maximum replacement value for Red and Green as 80. It would then assign an intensity value of 64 for the pixel in the yellow subfield, as 64 is the maximum intensity of yellow that can be displayed using the above-referenced weighting scheme without providing a greater intensity of yellow than exists in the pixel.

Consider another example in which a pixel has FICC values of Red 240, Green 100, and Blue 200. In this case, assume white is selected as the FSCC. Given the FSCC subframe weights of 32, 64 and 128, the pixel transform logic 504 selects a FSCC intensity value of 96, the highest common intensity level shared by each of the FICCs that can be generated using the available FSCC subframe weights. Thus, the pixel transform logic 504 sets the FSCC and FICC color subfield values for the pixel to be Red 154, Green 4, Blue 154 and White 96.

While using a reduced number of subframes for a FSCC reduces the load on the display to generate extra subframes, it does pose the risk of causing DFC when displaying neighboring pixels having a similar overall colors, but which are displayed using different FSCC values. For example, DFC might arise when displaying neighboring pixels having respective maximum replacement intensity values of 95 and 96 such as for colors Red 95, Green 95, and Blue 0 and Red 96, Green 96, and Blue 0. Assuming the FSCC is yellow, the first pixel would be displayed using a FSCC intensity of 64 and red blue and green intensities of Red 31, Green 31, and blue 0, respectively. The second pixel would be displayed with a FSCC intensity of 96 and red, green, and blue intensities of Red 0, Green 0, Blue 0. This significant difference in the FSCC color channel coupled with the significant differences in the red and green channels can be detected by the HVS, resulting in a DFC artifact.

The FSCC and FICC derivation processes described above aim to faithfully reproduce an image encoded in the image data in a received image. In some implementations, the subfield derivation logic of a controller is configured to generate subfields which, when displayed, intentionally result in a displayed image that differs from the input image data. For example, in some implementations, subfield derivation logic can be configured to generate image frames that generally have a higher luminance than indicated in a received image frame.

In one such implementation, after a FSCC subfield is generated using the reduced-subframe replacement strategy described above, a scaling factor is derived and applied when adjusting each of the pixel values in the FICC subfields based on the FSCC subfield. The scaling factor for a pixel is calculated as a function of a saturation parameter, a minimum pixel luminance value, $Y_{min}$, and a maximum pixel luminance value, $Y_{max}$. The saturation parameter is derived from the degree of subframe reduction used in generating the FSCC subfield. For a display using 8 bits-per-color for its FICCs, the saturation parameter can be calculated as follows:

$$\text{saturation\_scale} = \frac{1}{255}\Sigma_{8-nx+1}^{7} 2^x,$$

Where nx is the number of bits used to display the FSCC. $Y_{min}$ and $Y_{max}$ are functions of the selected FSCC and the each pixel's FICC intensity values in the initial FICC subfields. They are calculated as follows:

$$Y_{min} = \min(RGB_{scaled} \times \min\{R, G, B\}),$$

$$Y_{max} = \max(RGB_{scaled} \times \max\{R, G, B\}), \text{ and}$$

$$RGB_{scaled} = \left\{\frac{R}{x_R}, \frac{G}{x_G}, \frac{B}{x_B}\right\}, \text{ where } (x_R, x_G, x_B \neq 0).$$

In the above, $x_R$, $x_G$, and $x_B$ represent relative intensities of red, green, and blue in the FSCC (expressed as a value between 0 and 1, where 0 corresponds to no intensity and 1 corresponds to a maximum possible intensity). R, G, and B correspond to the red, green, and blue intensity values (expressed as values between 0 and 1) for a given pixel in a received image frame. Thus $Y_{min}$ is the minimum value of the set:

$$\left[\frac{R}{x_R} \times \min(R, G, B), \frac{G}{x_G} \times \min(R, G, B), \frac{B}{x_B} \times \min(R, G, B)\right],$$

and $Y_{max}$ is the maximum value of the set:

$$\left[\frac{R}{x_R} \times \max(R, G, B), \frac{G}{x_G} \times \max(R, G, B), \frac{B}{x_B} \times \max(R, G, B)\right],$$

The scaling factor, M, is then calculated as:

$$M = \text{saturation\_scale} \times \frac{Y_{min}}{Y_{max}}.$$

The new pixel intensity values, R', G', and B' for a pixel are then calculated by scaling the original FICC pixel values, R, G, and B, using the scaling factor, M, and subtracting out the intensity of each FICC in the FSCC channel subfield. These intensity values are in turn equal to the product of the FSCC intensity value for the pixel, x, and the relative intensity values of each FICC in the FSCC, i.e., $x_R$, $x_G$, and $x_B$. That is:

$$\begin{bmatrix} R' \\ G' \\ B' \end{bmatrix} = \begin{bmatrix} 1+M & 0 & 0 \\ 0 & 1+M & 0 \\ 0 & 0 & 1+M \end{bmatrix}\begin{bmatrix} R \\ G \\ B \end{bmatrix} - x\begin{bmatrix} x_R \\ x_G \\ x_B \end{bmatrix}$$

In some implementations, to help mitigate the DFC potentially arising from using only higher weighted subframes for the FSCC subframes, the pixel transform logic 504 modifies the FSCC subfield by applying a spatial dithering algorithm to the FSCC subfield prior to updating the FICC subfields. The spatial dithering distributes any quantization error associated with using the reduced number of higher-weighted subframes. Various spatial dithering algorithms, including an error diffusion algorithm (or variants thereof) can be used to effect the dithering. In some other implementations, block quantization and ordered dithering algorithms may be employed, instead. The intensity values of the pixels in the FICC subfields are then calculated accordingly based on the dithered FSCC subfield.

In each of the implementations set forth above, a FSCC was selected based on computing the median tristimulus values of the pixels in an image frame. The distances to the MTC corresponding to the set of median tristimulus values referred to above serve as a proxy for the prevalence of each FSCC in the image frame. In other implementations, other proxies may be used. For example, the FSCC in some implementations can be based on the mean or the mode of the pixel tristimulus values. In some other implementations, the FSCC may be based on the median, mean, or mode RGB pixel intensity values for the image frame.

Some implementations of a subfield derivation logic similar to the subfield derivation logic 500 shown in FIG. 5 also incorporate CABC logic. In such implementations, after the FSCC subfields and FICC subfields are derived, the CABC logic normalizes the intensity values in one or more of the subfields such that the maximum intensity value in each normalized subfield is scaled to the maximum intensity value output by the display. For example, in a display capable of outputting 256 gray scale levels, the subfield values are scaled such that the maximum intensity value therein is equal to 255. The subfield derivation logic then outputs corresponding normalization factors to the output control logic of the apparatus in which it is incorporated such that the illumination levels of the corresponding LEDs are adjusted accordingly.

Referring back to FIGS. 5 and 6, as set forth above, in some implementations, the subfield derivation logic 500 of a controller is configured to generate FSCC subfields using a FSCC that was selected based on the data in the previous image frame, referred to as a "delayed FSCC." Doing so can be advantageous as it allows color subfield derivation (stage 406) to be carried out in parallel with selection of the FSCC for the subsequent image frame (stages 605). Doing so also removes the need for a memory to store FICC subfields while they are being processed to determine the FSCC. However, if the color composition of an image frame is substantially different than the color composition of a previous image frame, such as often occurs during scene changes, the use of a delayed FSCC can result in reduced image quality for the current image frame and a noticeable flicker when the FSCC changes for the frame thereafter.

The potential shortcomings of using a delayed FSCC can be mitigated, though, through use of a FSCC smoothing process. The smoothing process can be incorporated into the selection logics 510 and 1010 shown in FIGS. 5 and 10, respectively. In general, the color smoothing process limits the degree to which the FSCC is allowed to change from frame to frame.

Figure 10:
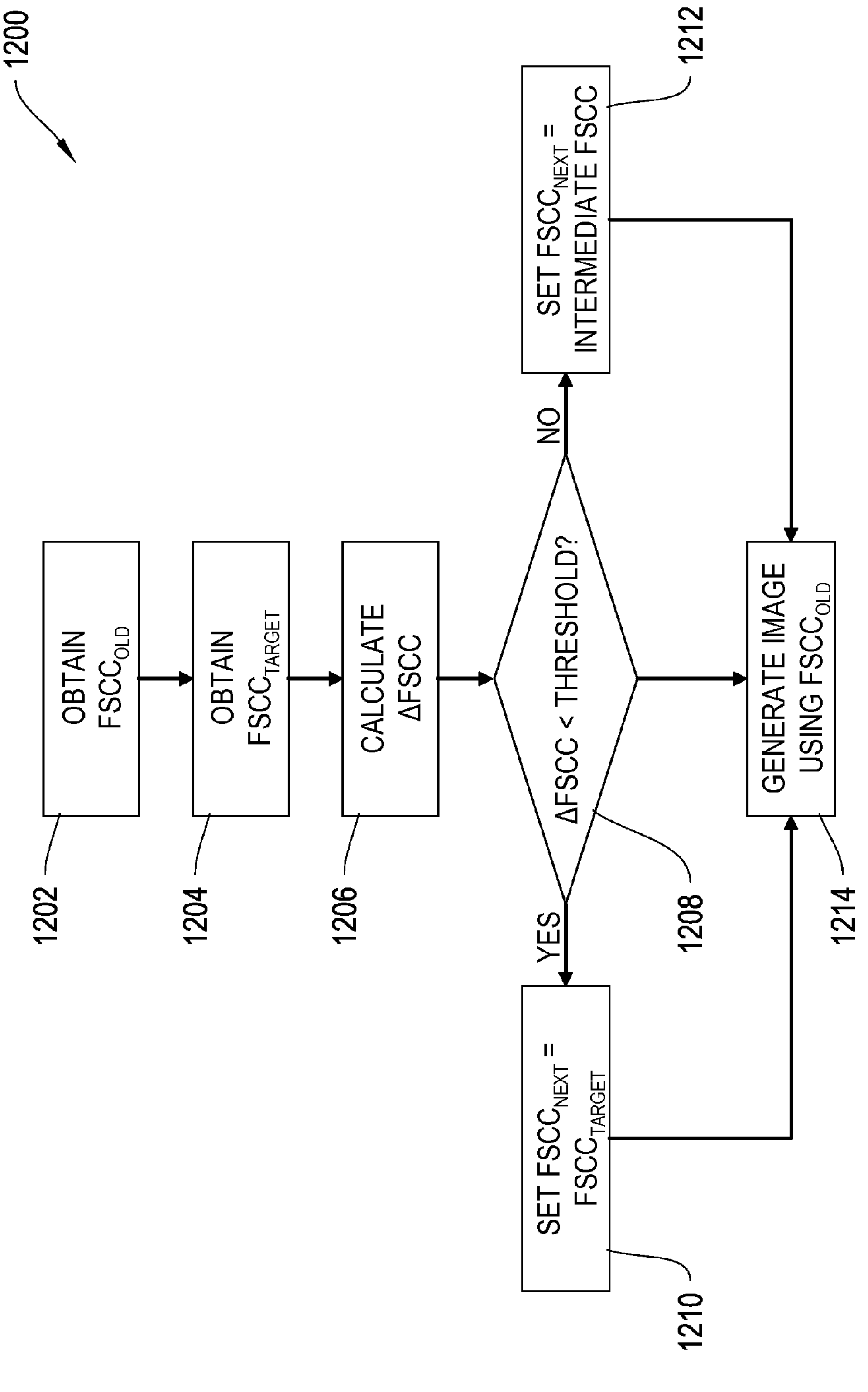
FIG. 10 shows a flow diagram of an example color FSCC smoothing process.

FIG. 10 shows a flow diagram of an example FSCC color smoothing process 1200. The FSCC color smoothing process 1200 may be executed by, for example, the selection logics 510 or 1010 shown in FIGS. 5 and 10, respectively. The process 1200 includes the selection logic obtaining a previous FSCC, $FSCC_{old}$ (stage 1202); obtaining a new, target FSCC, $FSCC_{target}$ (stage 1204); calculating a difference between the previous FSCC and the target FSCC, ΔFSCC (stage 1206); and comparing ΔFSCC to a color change threshold (stage 1208). If ΔFSCC falls below the color change threshold, the selection logic sets the next FSCC, $FSCC_{next}$, to $FSCC_{target}$ (stage 1210). Otherwise, the selection logic sets $FSCC_{next}$ to an intermediate FSCC between $FSCC_{old}$ and $FSCC_{target}$ (stage 1212). In either case, the current image frame is then generated using $FSCC_{old}$.

As set forth above, the color smoothing process 1200 begins with the selection logic obtaining the value of $FSCC_{old}$. For example, FSCC may be stored in memory in the controller executing the process 1200. Next, the selection logic obtains a value for $FSCC_{target}$ (stage 1204). $FSCC_{target}$ is the FSCC that would be used to generate the next image frame, absent any color smoothing implemented by the process 1200. The selection logic can select the $FSCC_{target}$ according to any of the FSCC selection processes described above.

Once the $FSCC_{old}$ and $FSCC_{target}$ are obtained, the selection logic computes ΔFSCC (stage 1206). In one implementation, ΔFSCC is calculated for each FICC component used to generate in the respective FSCCs. That is, the selection logic computes a $\Delta FSCC_{Red}$, a $\Delta FSCC_{Green}$, and a $\Delta FSCC_{Blue}$ equal to the difference in the red, blue, and green components, respectively of $FSCC_{old}$ and $FSCC_{target}$.

Each FICC component of $FSCC_{next}$ is then determined separately. If the intensity change in a color component falls below a corresponding color change threshold, that color component in $FSCC_{next}$ is set directly to the target intensity of that color component (stage 1208). If not, that color component in $FSCC_{next}$ is set to an intermediate value between the value of the component in $FSCC_{old}$ and $FSCC_{target}$ (stage 1210). It is computed as follows:

$$FSCC_{next}(i)=FSCC_{old}(i)+\Delta FSCC(i)*\text{percent\_shift}(i),$$

where i is a FICC color component and percent_shift(i) is an error parameter defining the degree with which the component color is allowed to shift from frame to frame. In some implementations, the percent_shift(i), is set separately for each component color. Its value, in some implementations, ranges from around 1% to around 5%, though in other implementations it may be as high as about 10% or higher for one or more component colors. The selection logic, in some implementations, also applies separate color change thresholds for each color component. In other implementations, the color change threshold is constant for all component colors. Suitable thresholds, assuming an 8-bit per color grayscale scheme in which component color intensities range from 0 to 255, range from around 3 to around 25.

In some implementations, the selection logic applies multiple color change thresholds and corresponding percent_shift(i) parameters for one or more component colors. For example, in one implementation, if ΔFSCC(i) exceeds an upper threshold, then a lower percent_shift(i) parameter is applied. If ΔFSCC(i) falls between the upper threshold and a lower threshold, a second higher percent_shift(i) parameter is applied. In some implementations, the lower percent_shift(i) parameter is less than or equal to about 10%, and the second, higher percent_shift(i) parameter is between about 10% and about 50%.

In some other implementations, ΔFSCC is calculated holistically for the FSCC in the CIE color space, using the x and y coordinates of $FSCC_{old}$ and $FSCC_{target}$. In such implementations, ΔFSCC is the Euclidean distance between the FSCCs on a CIE diagram. If the distance exceeds a color change threshold, the $FSCC_{next}$ is set to color corresponding to a point a fraction (percent_shift_CIE) of the way along a line connecting $FSCC_{old}$ and $FSCC_{target}$ in the CIE diagram. Similar distances can be computer using the FSCCs' tristimulus values.

After the selection logic determines $FSCC_{next}$, the current image frame is displayed using $FSCC_{old}$, and $FSCC_{next}$ is stored as the new $FSCC_{old}$ for use in the next image frame.

As discussed above in relation to FIG. 10, a FSCC smoothing process (hereinafter referred to as "the first FSCC smoothing process") can be utilized to reduce artifacts in the display of images. In particular, the first FSCC smoothing process 1200 shown in FIG. 10 smoothens the transition from a current image frame being displayed using $FSCC_{old}$ to a next image frame to be displayed using $FSCC_{target}$ if a change in intensity of a component color of the FSCCs exceeds a threshold value. The first FSCC smoothing process 1200 eases the transition by displaying the next image frame using an intermediate FSCC between $FSCC_{old}$ and $FSCC_{target}$.

In some implementations, a DFC-like image artifacts may occur when $FSCC_{old}$ includes two color components having non-zero intensities and $FSCC_{target}$ includes three color components having non-zero intensities. DFC-like artifacts may also occur when $FSCC_{old}$ includes three color components having non-zero intensities and the $FSCC_{target}$ includes two color components having non-zero intensities.

For example, assume that $FSCC_{old}$ is determined to be the color white and is represented by [0.5, 0.5, 0.5], where 0 corresponds to no intensity and 1 corresponds to maximum possible intensity of the colors red, green, and blue. Thus, $FSCC_{old}$ includes three color components having non-zero intensities. Then, DFC-like artifacts may occur if $FSCC_{target}$ were to include two color components having non-zero intensities. For example, DFC-like artifacts may occur if the $FSCC_{target}$ were represented by RGB intensities of [0.5, 0.7, 0] where the intensities of the R and G color components are non-zero while the intensity of blue is zero.

As another example, assume that $FSCC_{old}$ is determined to be the color yellow and is represented by [0.5, 0.5, 0]. Thus, $FSCC_{old}$ includes two color components (R and G) having non-zero intensities. Furthermore, assume that $FSCC_{target}$ is determined to be represented by [0.8, 0.9, 0.5], which includes three color components having non-zero intensities. Thus, as $FSCC_{old}$ includes two color components having non-zero intensities and $FSCC_{target}$ includes three color components having non-zero intensities, DFC-like artifacts may occur.

In some implementations, DFC-like artifacts may be particularly pronounced when FSCC changes from substantially white to substantially yellow or substantially cyan. In some other implementations, DFC-like artifacts may also be particularly pronounced when FSCC changes from substantially yellow or substantially cyan to substantially white.

These image artifacts can manifest themselves even when employing the first FSCC smoothing process 1200 shown in FIG. 10. In general, it has been found that to mitigate DFC-like artifacts, a third component color should only be added or removed from an FSCC if the other component colors of the FSCC are at or near zero intensity. Thus, were a display to transition from an FSCC having only two component colors having non-zero intensities to a target FSCC with meaningful intensities of all three component colors, or vice versa, and that target FSCC remained constant over a series of image frames, DFC-like artifacts would be mitigated at the transition by gradually, over a first number of image frames in a series of image frames, reducing the intensities of all component colors of the FSCC to values at or near zero, before gradually increasing the intensities of the component colors included in the target FSCC to their final target values over a remainder of image frames in the series of image frames. For example, if transitioning from a yellow FSCC to a white FSCC across several image frames, the FSCC would first transition to a dim yellow (decreasing the intensity of the red and green components of the FSCC) before beginning to increase the intensity of the blue component of the FSCC. Similarly, if transitioning from a white FSCC to a cyan FSCC, the FSCC would first transition to a dim white (decreasing the intensity of each of its red, green, and blue component colors to values at or near 0) before increasing the blue and green components of the FSCC to the desired intensity of cyan.

Such scenarios most frequently occur when transitioning between still images. However, with video content, target FSCCs may change (sometimes quite dramatically) from frame to frame. Accordingly, an FSCC smoothing process that implements the principles set forth above, can be designed to accommodate changing target FSCC values, and make frame by frame FSCC determinations to limit DFC-like artifacts while maintaining the ability to adjust FSCCs in a flexible manner.

Accordingly, in some implementations, to mitigate DFC-like artifacts, a second color smoothing process can be employed along with the first smoothing process to handle those FSCC transitions discussed above. The second color smoothing process can be executed when any one of the conditions mentioned above in which additional DFC-like artifacts mitigation is warranted (referred to as "transition artifact mitigation conditions") are met. That is, the second smoothing process is executed if an $FSCC_{old}$ includes two component colors having non-zero intensities and a calculated $FSCC_{target}$ includes three component colors having non-zero intensities or (ii) the $FSCC_{old}$ includes three component colors having non-zero intensities and the calculated $FSCC_{target}$ includes only two component colors having non-zero intensities.

Figure 11:
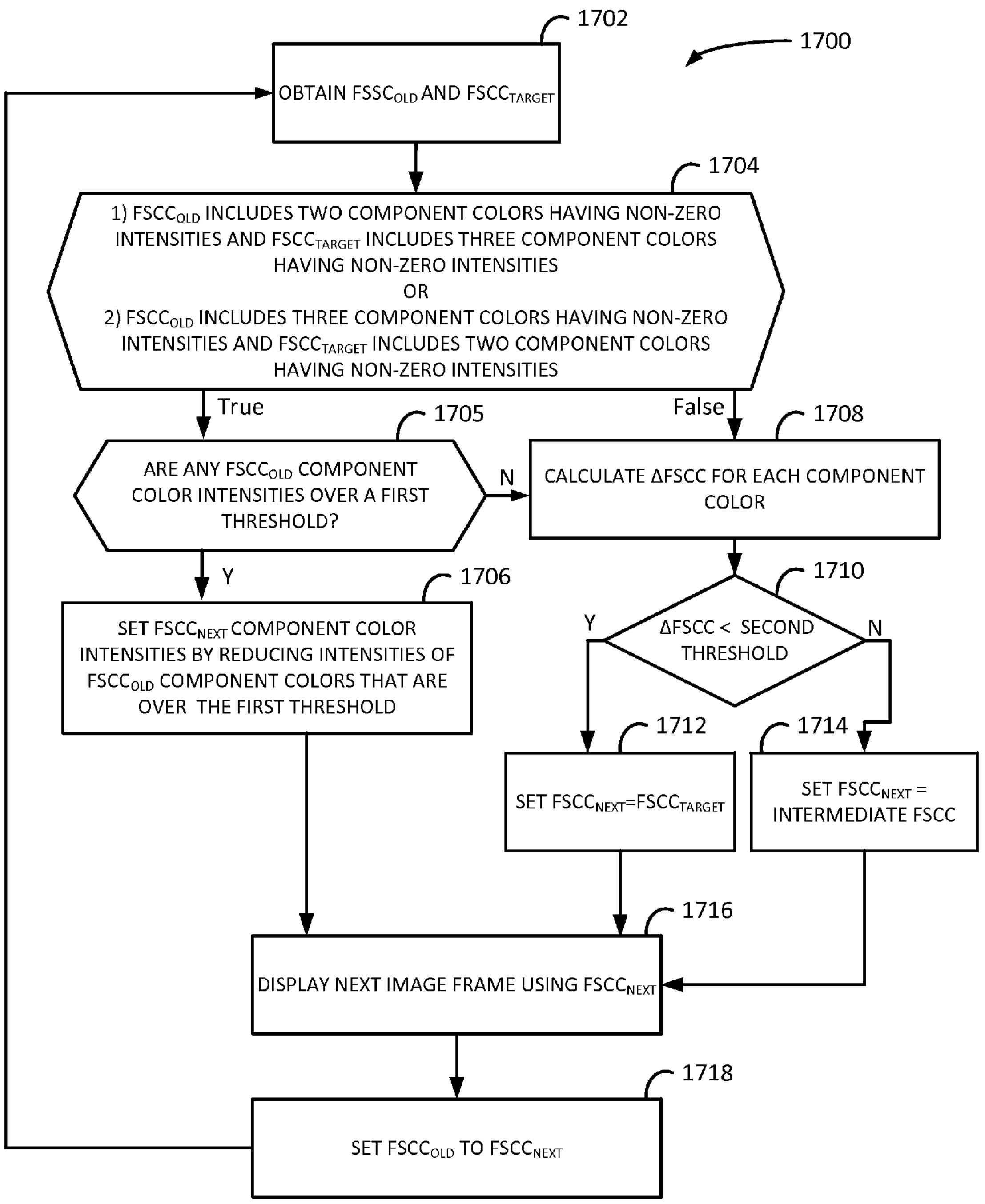
FIG. 11 shows a flow diagram including an example second FSCC smoothing process for mitigating color break-up during FSCC transitions.

FIG. 11 shows a flow diagram including an example second FSCC smoothing process 1700 for mitigating DFC-like artifacts during FSCC transitions. In particular, the second FSCC smoothing process 1700 may be executed by, for example, the selection logics 510 or 1010 shown in FIGS. 5 and 10, respectively. The second FSCC smoothing process 1700 includes obtaining the FSCC for the current image frame $FSCC_{old}$ and an FSCC for the next image frame ($FSCC_{target}$) (stage 1702) and determining whether the transition artifact mitigation conditions are met, i.e., whether either 1) $FSCC_{old}$ includes only two component colors having non-zero intensities and $FSCC_{target}$ includes three component colors having non-zero intensities or 2) $FSCC_{old}$ includes three component colors having non-zero intensities and $FSCC_{target}$ includes only two component colors having non-zero intensities (stage 1704). In response to either of the above conditions being true, the process 1700 includes determining whether any of the $FSCC_{old}$ component colors have intensities that are over a first threshold intensity (stage 1705). In response to any of the $FSCC_{old}$ component colors having intensities over the first threshold intensity, the process 1700 includes setting an FSCC for the next frame ($FSCC_{next}$) to an FSCC with reduced intensities of those component colors of $FSCC_{old}$ that are greater than the first threshold intensity (stage 1706). Any component colors of the $FSCC_{old}$ already at or below the first threshold can be kept constant in $FSCC_{next}$. In response to neither of the above conditions being true, or in response to none of the $FSCC_{old}$ component color intensities being over the first threshold, the process 1700 proceeds with a smoothing processing similar to the smoothing process 1200 shown in FIG. 10 by calculating ΔFSCC values for each component color between the $FSCC_{old}$ and $FSCC_{target}$ (stage 1708) and determining whether the ΔFSCC values for each of the component colors is less than a second threshold intensity (stage 1710). In response to the ΔFSCC values for all component colors being less than the second threshold intensity, the process 1700 includes setting $FSCC_{next}$ equal to $FSCC_{target}$ (stage 1712). In response to at least one ΔFSCC value for a component color being greater than the second threshold intensity, the process 1700 includes setting $FSCC_{next}$ to an intermediate FSCC (stage 1714) as described above in relation to FIG. 10. After $FSCC_{next}$ is set at stage 1706, 1712, or 1714, the process 1700 includes displaying the next image frame using $FSCC_{next}$ (stage 1716) and setting $FSCC_{old}$ to be equal to $FSCC_{next}$ (stage 1718). The process 1700 then repeats for subsequent image frames.

Figure 12:
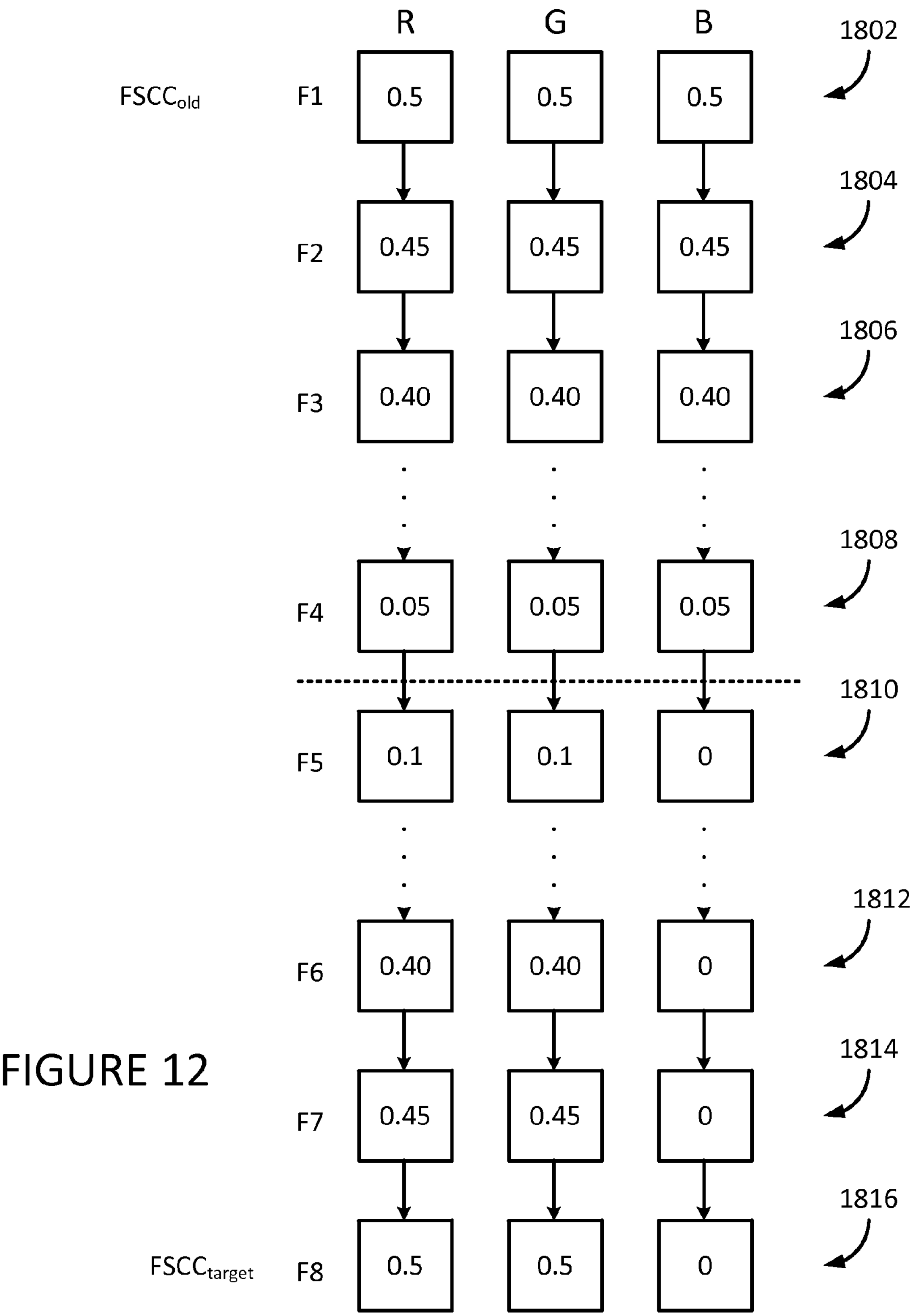
FIG. 12 shows one example result of the execution of the FSCC smoothing process shown in FIG. 11.

FIG. 12 shows one example result of the execution of the process 1700 shown in FIG. 11. The example in FIG. 12 represents the basic case in which a display transitions from displaying one still image to another still image, where each still image is displayed for more than a de minimis amount of time, for example, at least one second. As such, during such a transition, while $FSCC_{old}$ may change from frame to frame, $FSCC_{target}$ would remain the same. To demonstrate the transition, FIG. 12 shows a series of component color values R, G, and B used to form the FSCCs 1802-1816 of a sequence of image frames F1-F8.

More particularly, FIG. 12 shows the results of the FSCC transitioning from color white to color yellow via a set of intermediate FSCCs determined by the second FSCC smoothing process 1700. As shown, an initial $FSCC_{old}$ has been determined to be the color white represented by RGB intensities of [0.5, 0.5, 0.5], while the $FSCC_{target}$ has been determined to be the color yellow represented by RGB intensities of [0.5, 0.5, 0]. Further, it is assumed that the first threshold intensity for each component color is equal to about 0.1.

Referring to FIGS. 11 and 12, the second FSCC smoothing process 1700 includes obtaining the FSCC for the current image frame ($FSCC_{old}$) and a target FSCC for the next image frame ($FSCC_{target}$) (stage 1702). In the example shown in FIG. 12, the second FSCC smoothing process 1700 determines the $FSCC_{old}$ for the current image frame to be [0.5, 0.5, 0.5] and determines the $FSCC_{target}$ for the subsequent image frame to be [0.5, 0.5, 0].

The second FSCC smoothing process 1700 then determines whether transitioning from the $FSCC_{old}$ to $FSCC_{target}$ is likely to lead to DFC-like artifacts due to a change in the number of component colors used to form the respect FSCCs (stage 1704). That is, as set forth above, the process 1700 includes determining whether $FSCC_{old}$ includes two component colors having non-zero intensities and $FSCC_{target}$ includes three component colors having non-zero intensities or whether $FSCC_{old}$ includes three component colors having non-zero intensities and $FSCC_{target}$ includes two component colors having non-zero intensities (stage 1704). Referring to FIG. 12, the second FSCC smoothing process 1700 determines that the $FSCC_{old}$ includes three component colors having non-zero intensities and that $FSCC_{target}$ includes two component colors having non-zero intensities. Thus, the second FSCC smoothing process 1700 determines that at least one transition artifact mitigation condition is met.

The second FSCC smoothing process 1700 further includes, in response to the transition artifact mitigation condition being met, determining whether any of the $FSCC_{old}$ component colors have intensities that are over a first threshold intensity (stage 1705). As shown in FIG. 12, all three component colors (each having an intensity of 0.5) have intensities over the first threshold intensity of 0.1. Therefore, the process 1700 proceeds to stage 1706.

The second FSCC smoothing process 1700 further includes setting an FSCC for the next frame ($FSCC_{next}$) to an FSCC that includes reduced intensity values for the those component colors of $FSCC_{old}$ that are greater than the first threshold intensity (stage 1706). In some implementations, the intensities of any component color below the intensity threshold can be kept constant. In some implementations, the intensity of that component color is reduced, too. Referring again to FIG. 12, the $FSCC_{old}$ 1802 for image frame F1 is [0.5, 0.5, 0.5]. As all component colors of the $FSCC_{old}$ have intensities greater than the first threshold intensity of 0.1, the second FSCC smoothing process 1700 reduces the intensities of each component color of $FSCC_{old}$ to form $FSCC_{next}$. In some implementations, the amount of intensity reduction for a component color can be based on a percentage of the intensity of that component color. Suitable reduction percentages may range from around 5% to about 25%. For example, if the percentage of reduction is set to 10%, then the intensity of the color red would be reduced from 0.5 to 0.45. In some other implementations, the amount of reduction can be a constant value. For example, as shown in FIG. 12, the amount of reduction can be set to about 0.05. Thus, the second FSCC smoothing process 1700 sets $FSCC_{next}$ to [0.45, 0.45, 0.45].

The second FSCC smoothing process 1700 also includes displaying the next image frame using the $FSCC_{next}$ (stage 1716). As shown in FIG. 12, the FSCC smoothing process 1700 displays image frame F2 using the FSCC 1804 being equal to [0.45, 0.45, 0.45].

The second FSCC smoothing process 1700 further includes setting $FSCC_{old}$ to be equal to $FSCC_{next}$ (stage 1718). Referring again to FIG. 12, the second FSCC smoothing process 1700 sets $FSCC_{old}$ to [0.45, 0.45, 0.45].

The second FSCC smoothing process 1700 then repeats, by obtaining $FSCC_{old}$ and $FSCC_{target}$ (stage 1702) for the next image frame. As discussed above, the $FSCC_{old}$ is set to [0.45, 0.45, 0.45] at the previous stage 1718. Since the subsequent image in this example is identical to the previous frame, the $FSCC_{target}$ remains at [0.5, 0.5, 0]. As the transition from $FSCC_{old}$ to $FSCC_{target}$ would still result in changing from an FSCC with three component colors having non-zero intensities to an FSCC with only two component colors having non-zero intensities, (stage 1704) the second FSCC smoothing process 1700 proceeds to stage 1705, in which it is determined whether the intensities of any component colors of $FSCC_{old}$ is greater than the first threshold (stage 1705). As the intensities of all the component colors (0.45) is greater than the first threshold intensity of 0.1, the process 1700 reduces the intensities of $FSCC_{old}$ 1804 to [0.4, 0.4, 0.4] to form the new $FSCC_{next}$ 1806 (stage 1706). Then, the FSCC smoothing process 1700 displays the image frame F3 using the new $FSCC_{next}$ 1806 (stage 1708).

The second FSCC smoothing process 1700 continues to reduce the intensities of the FSCC for each successive image frame until the conditions identified in stage 1704 or 1705 are no longer true. For example, referring to FIG. 12, when image frame F4 is displayed, the $FSCC_{old}$ 1808 is [0.05, 0.05, 0.05]. Thus, none of the component colors of the $FSCC_{old}$ are over the first threshold intensity of 0.1. As a result, the process 1700 moves to stage 1708. The process would likewise stop if, while the component colors of $FSCC_{old}$ were still all non-zero, $FSCC_{target}$ changed to a color that also included three non-zero intensity component colors.

As a result, in determining the FSCC to be used for frame F5, the second FSCC smoothing process 1700 calculates ΔFSCC values for each component color between the $FSCC_{old}$ and $FSCC_{target}$ (stage 1708) as is described above in relation to stage 1206 shown in FIG. 10. Specifically, the second FSCC smoothing process 1700 determines the difference in intensities between $FSCC_{old}$ and $FSCC_{target}$ for each component color. Thus, in the example shown in FIG. 12, the second FSCC smoothing process 1700 determines that the ΔFSCC for the red, green, and blue component colors of the FSCC between frames F4 and F5 are [0.45, 0.45, 0.05].

The FSCC smoothing process 1700 also includes determining whether ΔFSCC for any component color is less than a second threshold intensity (stage 1710). This stage is similar to stage 1208 discussed above in relation to the first color smoothing process 1200 shown in FIG. 10. The second threshold can be the same as the threshold used in evaluating the transition artifact mitigation conditions, or it can be a different value. In the example shown in FIG. 11, it is assumed the second threshold is also equal to 0.1. As determined in the previous stage, the ΔFSCC for component colors red, green, and blue is 0.45, 0.45, and 0.05, respectively. Thus, the ΔFSCC for colors red and green is greater than the threshold intensity while the ΔFSCC for color blue is less than the threshold intensity.

In response to the ΔFSCC values being greater than the threshold intensity, the second FSCC smoothing process 1700 sets $FSCC_{next}$ to an intermediate FSCC (stage 1714). This process stage is similar to the process stage 1212 discussed above in relation to the first color smoothing process 1200 shown in FIG. 10. In particular, in process stage 1714 the process 1700 assigns to a component color an intermediate intensity value between the corresponding component color values in $FSCC_{old}$ and $FSCC_{target}$. For example, referring to FIG. 12, as the intensities for the red and green colors are greater than the threshold intensity, the second FSCC smoothing process 1700 assigns intermediate values of 0.1 and 0.1 for color red and green, respectively.

If, on the other hand, the ΔFSCC values for all component colors are below the second threshold value, for example between frames F7 and F8 shown in FIG. 12, the second FSCC smoothing process 1700 sets $FSCC_{next}$ to be equal to $FSCC_{target}$ (stage 1712). This process stage is similar to the process stage 1210 discussed above in relation to the first FSCC smoothing process 1200 shown in FIG. 10.

As mentioned above, in some implementations, the $FSCC_{target}$ may change frame to frame, for example, when the display device is displaying video images where the content, and therefore the FSCC, can change dynamically and in some cases rapidly. However, as the second FSCC smoothing process 1700 bases the $FSCC_{next}$ on the $FSCC_{target}$ at each image frame, the second FSCC smoothing process 1700 adapts to any dynamic changes in the $FSCC_{target}$. Thus, in determining the FSCC values for any two subsequent image frames, the FSCCs can be determined using either stage 1706 or stages 1708-1714 of the FSCC smoothing method 1700.

In addition, while the example shown in FIG. 12 assumes constant values for the first threshold and the second threshold intensities, in some implementations, the threshold intensities can be determined dynamically. For example, one or both of the first and second threshold intensities can be determined based on the brightness of a current and/or subsequent image frame. Brightness can be calculated, for example, based on the mean or median pixel intensities in the image or images considered. In general, brighter images allow for higher transition thresholds, whereas lower brightness images demand lower transition thresholds. The specific threshold intensities can be determined algorithmically or via a lookup table keyed to the image brightness. Suitable threshold values range, in some implementations, from about 0.02 to about 0.25.

Figure 13:
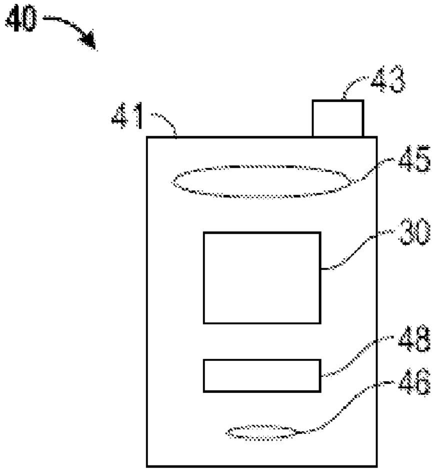
FIGS. 13 and 14 show system block diagrams illustrating a display device that includes a plurality of display elements.
Figure 14:
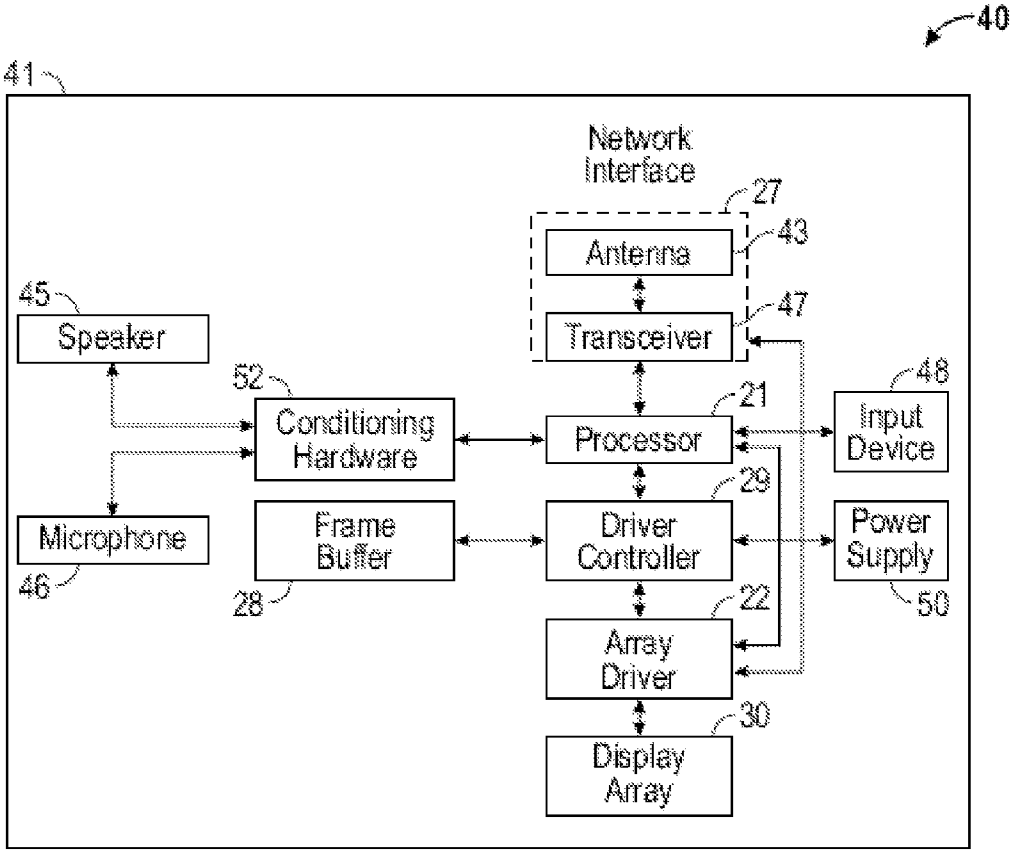

FIGS. 13 and 14 show system block diagrams illustrating a display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super-twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 13. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. In some implementations, the functions of the various implementations of the controller 300 shown in FIG. 3 may be carried out by a combination of the processor 21 and the driver controller 29. One or more elements in the display device 40, including elements not specifically depicted in FIG. 13, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:

an input configured to receive image data corresponding to a current image frame and image data corresponding to a target image frame;

contributing color selection logic configured to:

obtain based on received image data, an old frame specific contributing color ($FSCC_{old}$) for the current image frame and a target frame specific contributing color ($FSCC_{target}$) for the target image frame;

determine whether a transition artifact mitigation condition is met, wherein the transition artifact mitigation conditions includes the $FSCC_{old}$ including only two component colors having non-zero intensities and the $FSCC_{target}$ including three component colors having non-zero intensities and the $FSCC_{old}$ including three component colors having non-zero intensities and the $FSCC_{target}$ including only two component colors having non-zero intensities;

in response to a transition artifact mitigation condition being determined to be true, determine whether any component colors of the $FSCC_{old}$ are greater than a first threshold intensity;

in response to determining that at least one component color of the $FSCC_{old}$ has a greater intensity than the first threshold intensity, reduce intensities of component colors of $FSCC_{old}$ that are over the first threshold intensity to generate a next frame specific contributing color ($FSCC_{next}$) for a next image frame;

in response to the transition artifact mitigation conditions being determined to be false or in response to determining that none of the component colors of the $FSCC_{old}$ have intensities greater than the first threshold, setting $FSCC_{next}$ equal to $FSCC_{target}$ or to an intermediate FSCC having component color values between $FSCC_{old}$ and $FSCC_{target}$; and use the $FSCC_{next}$ to display the next image frame.

2. The apparatus of claim 1, wherein the first threshold intensity is based on an overall brightness of the current image frame.

3. The apparatus of claim 1, wherein the contributing color selection logic is configured to reduce intensities of component colors of $FSCC_{old}$ that are over the first threshold intensity by amounts that are fractions of intensities of their respective component colors.

4. The apparatus of claim 1, wherein the contributing color selection logic is configured to reduce, by a constant amount, intensities of those component colors of $FSCC_{old}$ that are over the first threshold intensity.

5. The apparatus of claim 1, wherein the component colors include colors red, green and blue (RGB).

6. The apparatus of claim 1, further comprising:

a display, wherein the display includes a plurality of display elements;

a processor that is configured to communicate with the display, the processor configured to process image data; and a memory device that is configured to communicate with the processor.

7. The apparatus of claim 6, further comprising:

a driver circuit configured to send at least one signal to the display; and a controller, including the contributing color selection logic and subframe generation logic, configured to send at least a portion of the image data to the driver circuit.

8. The apparatus of claim 6, further comprising an image source module configured to send the image data to the processor, wherein the image source module includes at least one of a receiver, transceiver, and transmitter.

9. The apparatus of claim 6, further comprising:

an input device configured to receive input data and to communicate the input data to the processor.

10. A method comprising:

obtaining, by a processor, based on received image data, an old frame specific contributing color ($FSCC_{old}$) for a current image frame and a target frame specific contributing color ($FSCC_{target}$) for a target image frame;

determining, by the processor, whether a transition artifact mitigation condition is met, wherein the transition artifact mitigation conditions includes the $FSCC_{old}$ including only two component colors having non-zero intensities and the $FSCC_{target}$ including three component colors having non-zero intensities and the $FSCC_{old}$ including three component colors having non-zero intensities and the $FSCC_{target}$ including only two component colors having non-zero intensities;

in response to a transition artifact mitigation condition being determined to be true, determining, by the processor, whether any component colors of the $FSCC_{old}$ have intensities greater than a first threshold intensity;

in response to determining that at least one component color of the $FSCC_{old}$ has an intensity greater than a first threshold intensity, reducing, by the processor, intensities of component colors of $FSCC_{old}$ that are over the first threshold intensity to generate a next frame specific contributing color ($FSCC_{next}$) for a next image frame;

in response to the transition artifact mitigation conditions being determined to be false or in response to determining that none of the component colors of the $FSCC_{old}$ have intensities greater than the first threshold, setting, by the processor, $FSCC_{next}$ equal to $FSCC_{target}$ or to an intermediate FSCC having component color values between $FSCC_{old}$ and $FSCC_{target}$; and using, by the processor, the $FSCC_{next}$ to display the next image frame on a display comprising a plurality of display elements.

11. The method of claim 10, wherein the first threshold intensity is based on an overall brightness of the current image frame.

12. The method of claim 10, wherein reducing intensities of component colors of $FSCC_{old}$ that are over the first threshold intensity to generate the $FSCC_{next}$ includes reducing the intensities of the component colors by a fraction of the intensities of the component colors.

13. The method of claim 10, wherein reducing intensities of component colors of $FSCC_{old}$ that are over the first threshold intensity to generate the $FSCC_{next}$ includes reducing the intensities of the component colors by a constant amount.

14. A non-transitory computer readable storage medium having instructions encoded thereon, which when executed by a processor cause the processor to perform a method for displaying an image, comprising:

obtaining, based on received image data, an old frame specific contributing color ($FSCC_{old}$) for a current image frame and a target frame specific contributing color ($FSCC_{target}$) for a target image frame;

determining whether a transition artifact mitigation condition is met, wherein the transition artifact mitigation conditions includes the $FSCC_{old}$ including only two component colors over a threshold intensity and the $FSCC_{target}$ including three component colors having non-zero intensities and the $FSCC_{old}$ including three component colors having non-zero intensities and the $FSCC_{target}$ including only two component colors having non-zero intensities;

in response to a transition artifact mitigation condition being determined to be true, determining whether any component colors of the $FSCC_{old}$ have intensities greater than a first threshold intensity;

in response to determining that at least one component colors of the $FSCC_{old}$ has an intensity greater than a first threshold, reducing intensities of component colors of $FSCC_{old}$ that are over the first threshold intensity to generate a next frame specific contributing color ($FSCC_{next}$) for a next image frame;

in response to the transition artifact mitigation conditions being determined to be false or in response to determining that none of the component colors of the $FSCC_{old}$ have intensities greater than the first threshold, setting $FSCC_{next}$ equal to $FSCC_{target}$ or to an intermediate FSCC having component color values between $FSCC_{old}$ and $FSCC_{target}$; and using the $FSCC_{next}$ to display the next image frame.

15. The computer readable storage medium of claim 14, wherein the first threshold intensity is based on an overall brightness of the current image frame.

16. The computer readable storage medium of claim 14, wherein reducing intensities of component colors of $FSCC_{old}$ that are over the first threshold intensity to generate the $FSCC_{next}$ includes reducing the intensities of the component colors by a fraction of the intensities of the component colors.

17. The computer readable storage medium of claim 14, wherein reducing intensities of component colors of $FSCC_{old}$ that are over the first threshold intensity to generate the $FSCC_{next}$ includes reducing the intensities of the component colors by a constant amount.

* * * * *